(12) United States Patent
Gillespie et al.

(10) Patent No.: US 9,370,040 B2
(45) Date of Patent: Jun. 14, 2016

(54) METHODS AND APPARATUS FOR IMPROVING NFC LLCP PARTITIONING

(71) Applicant: QUALCOMM Incorporated, San Diego, CA (US)

(72) Inventors: Alan Gillespie, Farnborough (GB); John Hillan, Farnborough (GB); Jeremy R. O'Donoghue, Workingham (GB); Dubai Chingalande, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 13/671,975

(22) Filed: Nov. 8, 2012

(65) Prior Publication Data

US 2013/0165042 A1    Jun. 27, 2013

Related U.S. Application Data

(60) Provisional application No. 61/580,621, filed on Dec. 27, 2011, provisional application No. 61/669,314, filed on Jul. 9, 2012.

(51) Int. Cl.
  *H04B 7/00*    (2006.01)
  *H04W 76/06*   (2009.01)
  *H04W 4/00*    (2009.01)

(52) U.S. Cl.
  CPC ........... *H04W 76/068* (2013.01); *H04W 4/008* (2013.01)

(58) Field of Classification Search
  USPC ............... 455/41.1–41.3, 466, 343.3, 343.4
  See application file for complete search history.

(56) References Cited

U.S. PATENT DOCUMENTS

| 7,873,774 B2 | 1/2011 | Orishko et al. |
| 8,358,596 B2 * | 1/2013 | Byrne ................ H04W 76/02 370/255 |
| 2008/0085001 A1 | 4/2008 | Charrat et al. |

(Continued)

FOREIGN PATENT DOCUMENTS

EP    1986340 A2    10/2008

OTHER PUBLICATIONS

"Information technology Telecommunications and information exchange between systems Near Field Communication Interface and Protocol (NFCIP-1)", Technologies de l'information Telecommunications et e'change d'information entire systemes Communication de champ proche Interface et 37-42, protocole (NFCIP-1), International Standard ISO/IEC, XX, XX, vol. 18092, No. 1st edition, Apr. 1, 2004, p. 66PP, XP007905654, p. 6-p. 12, p. 34-p. 36.

(Continued)

*Primary Examiner* — Edward Urban
*Assistant Examiner* — Rui Hu
(74) *Attorney, Agent, or Firm* — Joseph Hanasz

(57) ABSTRACT

Aspects disclosed herein relate to partitioning LLCP responsibilities between the NFCC and DH. In an example, with a NFC device a DH maybe configured to establish a LLCP link with a remote NFC endpoint through a NFCC, and partition LLCP related responsibilities between the DH and the NFCC when the NFCC is operable for LLCP split communications. Further, the NFCC may be operable to receive a PDU from a remote NFC endpoint, determine whether the received PDU is a SYMM PDU or a link deactivation PDU, and communicate the received PDU to a DH upon a determination that the received PDU is not a SYMM PDU or a link deactivation PDU.

33 Claims, 15 Drawing Sheets

(56) References Cited

U.S. PATENT DOCUMENTS

| | | | |
|---|---|---|---|
| 2008/0232405 A1* | 9/2008 | Gallo | H04L 47/10 370/498 |
| 2008/0291852 A1* | 11/2008 | Abel | H04L 5/16 370/293 |
| 2009/0104875 A1 | 4/2009 | Naniyat | |
| 2009/0247077 A1 | 10/2009 | Sklovsky et al. | |
| 2011/0130095 A1 | 6/2011 | Naniyat et al. | |
| 2011/0226853 A1 | 9/2011 | Soh et al. | |
| 2013/0324169 A1* | 12/2013 | Kamal | H04W 4/008 455/466 |
| 2014/0035727 A1* | 2/2014 | Nguyen | H04W 4/008 340/10.1 |
| 2014/0142783 A1* | 5/2014 | Grimm | H04W 4/008 701/2 |

OTHER PUBLICATIONS

International Search Report and Written Opinion—PCT/US2012/070714—ISA/EPO—May 10, 2013.

"Smart Cards; UICC-CLF interface; Host Controller Interface P2P LNC Protocol (Document inputted in NFC Forum for information)", ETSI Draft; SCPT080001, European Telecommunications Standards Institute (ETSI), 650, Route Des Lucioles ; F-06921 Sophia-Antipolis ; France, No. V0.1.0, Jan. 11, 2008, pp. 133, XP014051745, [retrieved on Jan. 11, 2008].

Partial International Search Report—PCT/US2012/070714—ISA/EPO—Mar. 6, 2013.

* cited by examiner

US 9,370,040 B2

METHODS AND APPARATUS FOR IMPROVING NFC LLCP PARTITIONING

CLAIM OF PRIORITY UNDER 35 U.S.C. §119

The present application for patent claims priority to Provisional Application No. 61/580,621 entitled "METHODS AND APPARATUS FOR IMPROVING NFC FORUM LLCP PARTITIONING" filed Dec. 27, 2011, are Provisional Application No. 61/669,314 entitled "METHODS AND APPARATUS FOR IMPROVING NFC FORUM LLCP PARTITIONING" filed Jul. 9, 2012, and is assigned to the assignee hereof and hereby expressly incorporated by reference herein.

BACKGROUND

1. Field

The disclosed aspects relate generally to communications between devices and specifically to methods and systems for improving mechanisms for partitioning logical link control protocol (LLCP) symmetry procedure responsibilities between a Near Field Communication (NFC) controller (NFCC) a device host (DH).

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When NFC is implemented, a NFC enabled device may initially detect a NFC tag and/or target device. Thereafter, communications between NFC devices may use a NFC-data exchange protocol (DEP). Existing specifications by the NFC Forum allow for communications to occur symmetrically between devices using a link layer called LLCP. The present NCI specification requires all of the LLCP functionality to be provided by the DH.

At present, LLCP allows multiple applications to share access to the NFC radio connection to a remote NFC endpoint. One feature of the LLCP is the concept of a symmetry procedure which effectively makes the asymmetric RF link appear symmetric to the applications. The LLCP allows for each device to send a packet within a given timeout interval, and provides a special packet (e.g., SYMM protocol data unit (PDU)) that may be sent if there is no application data (e.g., PDU) to be communicated at that time. As such, the remote NFC endpoint may have the opportunity to send a payload as a "response" in the reverse direction to a SYMM PDU.

Implementation of the LLCP through the DH is costly in terms of power consumption. For example, a NFCC wakes up the DH every time a symmetry packet is received, and the timing precision at which the symmetry packet can be sent is limited by uncertainties in interrupt latency. Features associated with LLCP such as frame aggregation and disaggregation, service discovery, connection oriented link management (including sliding window buffering) use a large amount of memory and would be very costly to implement these functions on a NFC Controller.

Thus, improved apparatuses and methods providing mechanisms for partitioning LLCP responsibilities between the NFCC and DH may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with partitioning LLCP responsibilities between the NFCC and DH. In one example, with a NFC device a DH maybe configured to establish a LLCP link with a remote NFC endpoint through a NFCC, and partition LLCP related responsibilities between a DH and the NFCC when the NFCC is operable for LLCP split communications. Further, the NFCC may be operable to receive a PDU from a remote NFC endpoint, determine whether the received PDU is a SYMM PDU or a link deactivation PDU, and communicate the received PDU to a DH upon a determination that the received PDU is not a SYMM PDU or a link deactivation PDU.

According to related aspects, a method provides a mechanism for partitioning LLCP responsibilities between the NFCC and DH. The method can include receiving, by a NFCC operable to perform LLCP split communications, a PDU from a remote NFC endpoint. The method may include determining whether the received PDU is a SYMM PDU or a link deactivation PDU. In an aspect, the SYMM PDU and the link deactivation PDU may be associated with a LLCP link. Moreover, the method can include communicating the received PDU to a DH upon a determination that the received PDU is not a SYMM PDU or a link deactivation PDU.

Another aspect relates to a communications apparatus. The communications apparatus can include means for receiving, by a NFCC operable to perform LLCP split communications, a PDU from a remote NFC endpoint. The communications apparatus can include means for determining whether the received PDU is a SYMM PDU or a link deactivation PDU. In an aspect, the SYMM PDU and the link deactivation PDU may be associated with a LLCP link. Moreover, the communications apparatus can include means for communicating the received PDU to a DH upon a determination that the received PDU is not a SYMM PDU or a link deactivation PDU.

Another aspect relates to a communications apparatus. The apparatus can include a NFCC operable to perform LLCP split communications and configured to receive a PDU from a remote NFC endpoint. The NFCC may be configured to determine whether the received PDU is a SYMM PDU or a link deactivation PDU. In an aspect, the SYMM PDU and the link deactivation PDU may be associated with a LLCP link. The NFCC may also be configured to communicate the received PDU to a DH upon a determination that the received PDU is not a SYMM PDU or a link deactivation PDU.

Another aspect relates to a computer program product, which can have a computer-readable medium comprising code for receiving, by a NFCC operable to perform LLCP split communications, a PDU from a remote NFC endpoint. The computer-readable medium can include code for determining whether the received PDU is a SYMM PDU or a link deactivation PDU. In an aspect, the SYMM PDU and the link deactivation PDU may be associated with a LLCP link. The computer-readable medium can also include code for communicating the received PDU to a DH upon a determination that the received PDU is not a SYMM PDU or a link deactivation PDU.

According to another related aspect, a method for providing a mechanism partitioning LLCP responsibilities between the NFCC and DH. The method can include establishing a LLCP link with a remote NFC endpoint through a NFCC. Moreover, the method can include partitioning LLCP related responsibilities between a DH and the NFCC when the NFCC is operable for LLCP split communications. In an aspect, during the LLCP split communications the NFCC may be responsible for LLCP symmetry functionality and the DH may be responsible for non-LLCP symmetry functionality.

Another aspect relates to a communications apparatus. The communications apparatus can include means for establishing a LLCP link with a remote NFC endpoint through a NFCC. Further, the communications apparatus can include means for partitioning LLCP related responsibilities between a DH and the NFCC when the NFCC is operable for LLCP split communications. In an aspect, during the LLCP split communications the NFCC may be responsible for LLCP symmetry functionality and the DH may be responsible for non-LLCP symmetry functionality.

Another aspect relates to a communications apparatus. The apparatus can include a DH configured to establish a LLCP link with a remote NFC endpoint through a NFCC. The DH may also be configured to partition LLCP related responsibilities between a DH and the NFCC when the NFCC is operable for LLCP split communications. In an aspect, during the LLCP split communications the NFCC may be responsible for LLCP symmetry functionality and the DH may be responsible for non-LLCP symmetry functionality.

Another aspect relates to a computer program product, which can have a computer-readable medium comprising code for establishing a LLCP link with a remote NFC endpoint through a NFCC. The computer-readable medium can also include code for partitioning LLCP related responsibilities between a DH and the NFCC when the NFCC is operable for LLCP split communications. In an aspect, during the LLCP split communications the NFCC may be responsible for LLCP symmetry functionality and the DH may be responsible for non-LLCP symmetry functionality.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
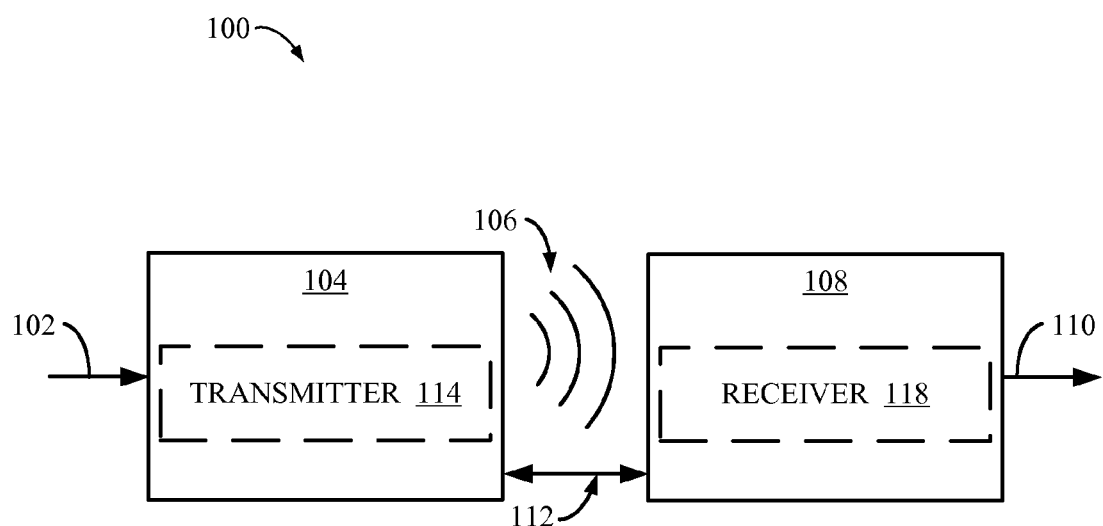
FIG. 1 is a block diagram of a wireless communication system according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described herein, a device may recognize a NFC target device and/or tag when within range of the coverage area of the NFC device and/or tag. Thereafter, the device may obtain sufficient information to allow for communications to be established. One form of communications that may be established is a NFC-DEP RF protocol based communication link. Communications between the devices may be enabled over a variety of NFC RF technologies, such as but not limited to, NFC-A, NFC-B, etc.

Generally, a DH may operate in an environment that is not substantially limited by memory constraints though with comparatively higher power consumption. Conversely, a NFCC may operate in a memory limited environment while consuming comparatively less power. As described herein, operations defined in the LLCP specification may be partitioned between the NFCC and DH. In an aspect, symmetry related procedures are performed by the NFCC (e.g., lower LLCP layer functionality) thereby relieving the application processor (e.g., DH) of having to be notified of anything except actual data. Further, other aspects of LLCP concerning activation, normal operation involving data, and deactivation, may be handled by the application processor (e.g., DH) (e.g., higher LLCP layer functionality).

Parameters may be communicated by the DH to the NFCC to further improve LLCP based communications. In an aspect, additional parameters may be defined to facilitate partitioning of LLCP based operations. For example, following link activation LLCP implementations at the remote NFC endpoint and the DH have exchanged link timeout parameters to be used by the symmetry procedure. During LLCP partitioning, the DH may subsequently inform the NFCC of a timeout value. In an aspect, this may be done using a configuration parameter (e.g., LLCP_LINK_TIMEOUT). Generally, time taken for a LLCP implementation to send a symmetry packet has an impact on both power consumption and on link latency. I.e., the longer the device waits to transmit a symmetry packet (e.g., SYMM PDU), the lower the power consumption, but the greater the latency if the remote NFC endpoint is waiting for a transmission opportunity. In an aspect, a symmetry backoff timer parameter (e.g., LLCP_SYMMETRY_BACKOFF) allows the DH to expressly indicate to the NFCC that a packet should be sent earlier by a defined amount. In operation, use of the above described parameters may allow the device to tune (statically and/or dynamically) parameter values based at least in part on the trade-off between power consumption and link latency.

As such, the full features of LLCP may be implemented in a more memory efficient manner than if all of the functionality were to be implemented on a memory constrained device (e.g., NFCC), and in a more power efficient manner than if all the functionality were implemented on a high power application processor (e.g., DH). In an aspect, configuration parameters as described above also provide a capability to tune the performance of LLCP based on user-visible parameters such as power consumption and link latency.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
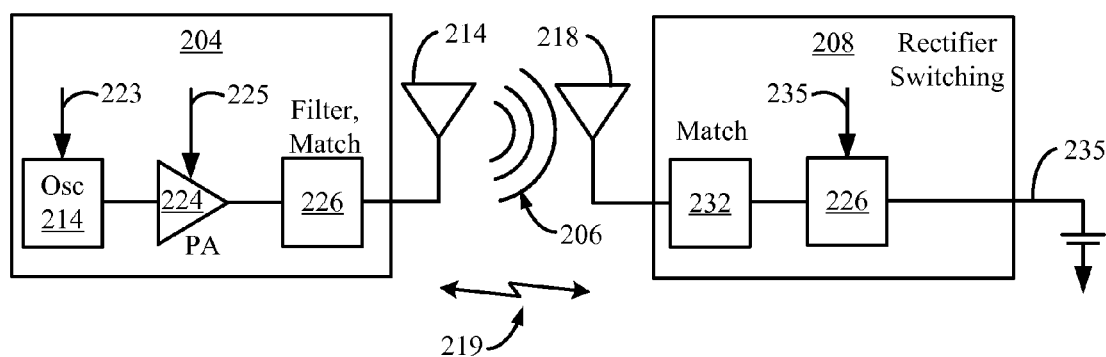
FIG. 2 is a schematic diagram of a wireless communication system according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc.).

Figure 3:
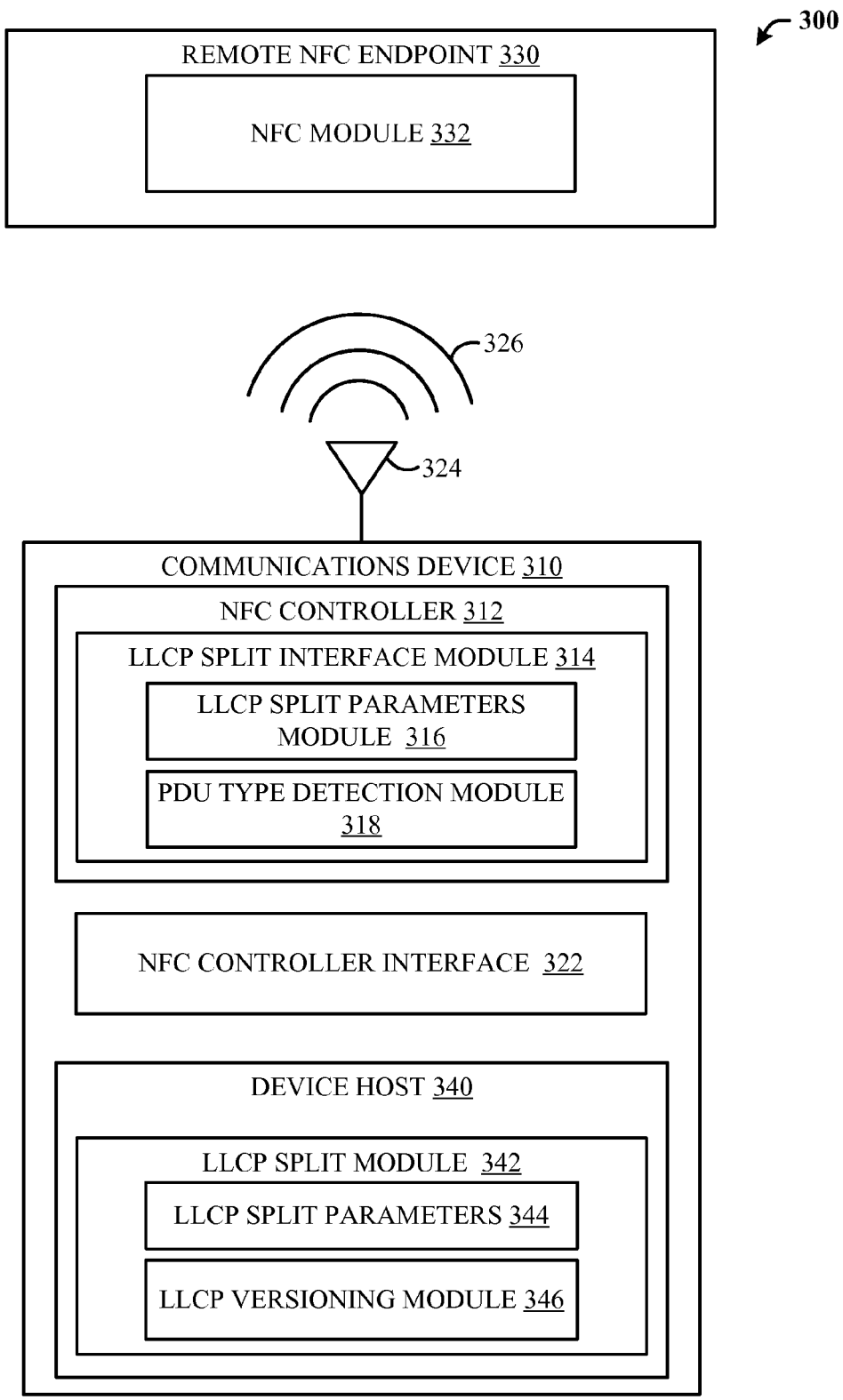
FIG. 3 is a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC endpoint 330 using one or more NFC technologies 326 (e.g., NFC-A, NFC-B, NFC-F, etc.). In an aspect, remote NFC endpoint 330 may be operable to communicate using NFC module 332 through various interfaces, such as frame RF interface and ISO-DEP RF interface, NFC-DEP RF interface. In another aspect, communications device 310 and remote NFC endpoint 330 may establish a NFC-DEP RF protocol based communication link with link layer connections defined through a LLCP. In still another aspect, communications device 310 may be operable to be connected to an access network and/or core network (e.g., a CDMA network, a GPRS network, a UMTS network, and other types of wireline and wireless communication networks).

In an aspect, communications device 310 may include a NFC controller (NFCC) 312, a NFC controller interface (NCI) 322, and device host 340. In an aspect, device host 340 may be operable to obtain, through NCI 322, and NFC Controller 312 information from remote NFC endpoint 330, through remote NFC endpoint 330 and NFC module 332.

In an aspect, during NFC-DEP RF protocol based communications device host 340 may operate using a link layer protocols defined by LLCP. As noted above, LLCP allows multiple applications to share access to the NFC radio connection to a remote NFC endpoint. One feature of the LLCP is the concept of a symmetry procedure which effectively makes the asymmetric RF link appear symmetric to the applications. The LLCP allows for each device (e.g., DH and remote NFC endpoint) to send a packet within a given timeout interval, and provides a special packet (e.g., SYMM protocol data unit (PDU)) that may be sent if there is no application data (e.g., PDU) to be communicated at that time.

In an aspect, communications device 310 may operate in a split LLCP mode (e.g., partitioning LLCP functionality between NFCC 312 and device host 340).

Device host 340 may include, among other modules, LLCP split module 342, LLCP split parameters 344, and LLCP versioning module 346. In an operational aspect, device host 340 may communicate LLCP split parameters 344 to NFCC to initiate and/or maintain a LLCP split operational mode. In an aspect, LLCP parameters 344 may include a symmetry timer that defines a time duration that the NFCC 312 waits to receive a PDU from the device host 340 prior to transmitting a symmetry packet (e.g., SYMM PDU), and a link timeout timer that defines a time duration that the NFCC 312 waits for a PDU from the remote NFC endpoint 330 prior to communicating a link failure message to the device host 340. An example format of a LLCP symmetry start command and response pair is described with reference to Table 1.

In an aspect, LLCP split module 342 may statically, semi-statically, and/or dynamically determine LLCP split parameters 344 based at least in part on default settings, power consumption, battery life, user settings, application latency settings, etc. For example, in an aspect, LLCP split module 342 may dynamically (e.g., subsequent to a LLCP link have been established) updated LLCP split parameters 344 using a LLCP command (e.g., RF_LLCP_START_SYMMETRY_CMD) with the new/updated parameters. In such an aspect, NFCC 312 may use the new values after an associated waiting time (e.g., initially defined waiting time) has completed. In another example aspect DH 340 may choose to perform the LLCP related function without NFCC 312 assistance. In such an aspect, DH 340 and/or LLCP split module 342 may communicate a LLCP command (e.g., RF_LLCP_START_SYMMETRY_CMD) in which timeout parameters (e.g., remote link timeout, local symmetry timeout, etc.) may be set to zero "0". In such an aspect, upon receipt of the LLCP command with the timeout parameters set to "0", NFCC 312 may discontinue any LLCP split functionality and begin forwarding any received PDUs for processing by the DH 340 and may also not send any PDUs other than those received from the DH 340.

In another aspect, LLCP versioning module 346 may determine compatibility with NFCC 312. With LLCP functionality split across DH 340 and NFCC 312, the version of LLCP supported is relevant. In operation the LLCP versioning module 346 may fetch a parameter from NFCC 312 to infer the capability of the NFCC 312, and thus decide whether subsequent messaging (e.g., RF DISCOVER MAP CMD should specify a LLCP-Split interface (with Symmetry functionality performed by NFCC 312) or a NFC-DEP interface where LLCP functions, including Symmetry, may be performed by DH 340. In an aspect, where the NFCC 312 LLCP version number is the same as DH 340, then LLCP versioning module 346 may configure the interface as LLCP-Split. In another aspect, where the NFCC 312 LLCP version number is lower than the DH 340 LLCP version number, then LLCP versioning module 346 may decide whether LLCP-Split functionality is still usable. If it is, LLCP versioning module 346 may configure the interface as LLCP-Split, otherwise LLCP versioning module 346 may fall back to NFC-DEP usage and may prompt DH 340 to perform Symmetry functions itself. In another aspect, where the NFCC 312 LLCP version number is higher than the DH 340 LLCP version number, then LLCP versioning module 346 may assume DH 340 does not understand what is communicated from NFCC 312, and LLCP versioning module 346 may configure the interface as NFC-DEP and perform Symmetry itself. Further, LLCP versioning module 346 may prompt DH 340 to exchange LLCP version numbers at link activation. An example format for providing the LLCP version numbering is provided with reference to Table 1.

TABLE 1

LLCP Version Parameter

| Bit Mask | | | | | | | | Description |
|---|---|---|---|---|---|---|---|---|
| b7 | b6 | b5 | b4 | b3 | b2 | b1 | b0 | |
| Octet 0 | X | X | X | X | | | | LLCP Major Version |
| | | | | | X | X | X | X LLCP Minor Version |

NFCC 312 may include, among other modules, LLCP split interface module 314, LLCP split parameters module 316, and PDU type detection module 318. In an aspect, where LLCP split functionality has been agreed upon between NFCC 312 and DH 340, LLCP split parameters module 316 may received LLCP split parameters 344 from DH 340 and may apply the parameters to their respective timers and/or other functions. In an aspect, LLCP split parameters module 316 may receive and process a symmetry timer that defines a time duration that the NFCC 312 waits to receive a PDU from the DH 340 prior to transmitting a SYMM PDU, and a link timeout timer that defines a time duration that the NFCC 312 waits for a PDU from the remote NFC endpoint prior to communicating a link failure message to the DH 340. In such an aspect, the LLCP split parameters may be received as, parameters in a core set configuration message, commands specific to LLCP split communications, etc. In an aspect, during LLCP split functionality, PDU type detection module 318 may be operable to determine the type of a received PDU, and in particular whether it is a symmetry packet (e.g., SYMM PDU), a link disconnect PDU (e.g. DISC PDU), or some other type. In operation, if PDU type detection module 318 determines the received packet includes any data besides a SYMM PDU or a DISC PDU, then PDU type detection module 318 communicated the received packet to DH 340. In another aspect, if PDU type detection module 318 determines the received packet includes a symmetry packet, then PDU type detection module 318 does not communicate the symmetry packet to DH 340, and rather determines whether a packet is ready for transmission to remote NFC endpoint 330. Where a packet is available for transmission, LLCP split interface module 314 may transmit the packet within a time period defined during the LLCP establishment and/or by a LLCP split parameter 344 provided by DH 340. In another aspect, when no packet is currently waiting, LLCP split interface module 314 may wait until the expiration of a time period defined during the LLCP establishment and/or by a LLCP split parameter 344 provided by DH 340, and upon no receipt of an application data packet, LLCP split interface module 314 may generate a symmetry packet (e.g., SYMM PDU) for transmission to remote NFC endpoint 330. In another aspect, LLCP split interface module 314 may detect reception of an application data packet within the time period defined during the LLCP establishment and/or by a LLCP split parameter 344 provided by DH 340. In such an aspect, LLCP split interface module 314 may transmit the packet prior to expiration of the defined time period.

In operation, NFC controller 312 and LLCP split interface module 314 may be operable in various modes. Table 2 provides various example RF interface values and their corresponding definitions.

TABLE 2

RF Interfaces

| RF Interface value | Definition |
|---|---|
| 0x00 | NFCEE Direct RF Interface |
| 0x01 | Frame RF Interface |
| 0x02 | ISO-DEP RF Interface |
| 0x03 | NFC-DEP RF Interface |
| 0x04 | LLCP Low RF Interface |
| 0x05-0x7F | RFU |
| 0x80-0xFE | For proprietary use |
| 0xFF | RFU |

For example, when LLCP split interface module 314 is set in an "Off" mode (e.g., the RF interface value associated with 0x04 set to "Off"), none of the extended features of the LLCP-Split RF interface may be available and NFCC 312 may function with a normal the NFC-DEP interface. In other words, DH 340 may still use LLCP while the "Off" state prevails, but DH 340 all functionality resides on the DH 340 including the Symmetry Procedure and link failure timeout. Further, any LLCP PDUs received by NFCC 312 from the remote NFC endpoint 330 while in the "Off" state may be passed to the DH 340. In an aspect, DH 340 LLCP split module 342 may activate extended features of the LLCP-Split interface by sending one or more commands (e.g., RF_LLCP_SYMMETRY_START_CMD/RSP, RF_LLCP_SYMMETRY_STOP_CMD/RSP, etc.) and/or parameters (e.g., CORE SET CONFIG CMD) to select initiator or target mode. In another aspect, DH 340 LLCP split module 342 may modify extended features of the LLCP-Split interface by sending a subsequent command (e.g., RF_LLCP_SYMMETRY_START_CMD) with updated/new parameters. In still another aspect, DH 340 LLCP split module 342 may reserve and/or reacquire the features of the LLCP-Split interface that had been abdicated to NFCC 312. In such an aspect, DH 340 LLCP split module 342 may communicate a command (e.g., RF_LLCP_SYMMETRY_START_CMD) with timeout parameters set to zero. An example format of a LLCP symmetry start command and response pair is described with reference to Table 3. An example format for LLCP system stop command, response, and notification messages are described with reference to Table 4. Tables referenced within Tables 3 and 4 refer to tables included in the NCI draft Standard.

TABLE 3

Control Messages for LLCP Symmetry Start

| Payload Field(s) | Length | Value/Description |
|---|---|---|
| RF_LLCP_SYMMETRY_START_CMD | | |
| Remote Link Timeout | 1 Octet | An 8-bit unsigned integer that specifies the value of the Remote NFC Endpoint's link timeout. In order to align with [LLCP], the value is expressed in multiples of 10 ms. |
| Local Symmetry Timeout | 1 Octet | An 8-bit unsigned integer that specifies the value of symmetry timeout. In order to align with [LLCP], the value is expressed in multiples of 10 ms. |
| RF_LLCP_SYMMETRY_START_RSP | | |
| Status | 1 Octet | See Table 92 |

TABLE 4

Control Messages for LLCP symmetry Stop

| Payload Field(s) | Length | Value/Description |
|---|---|---|
| RF_LLCP_SYMMETRY_STOP_CMD | | |
| Empty payload | | |
| RF_LLCP_SYMMETRY_STOP_RSP | | |
| Status | 1 Octet | See Table 92 |
| RF_LLCP_SYMMETRY_STOP_NTF | | |
| Status | 1 Octet | See Table 92 |

In initiator mode the state may change from "Off" to a wait for transmission mode (e.g., WaitForTx), while in target mode the states changes from "Off" to a wait for reception mode (e.g., WaitForRx). In the wait for transmission mode, LLCP-Split interface extended features may active and waiting for a PDU from the DH 340, via the static RF connection, to transmit to the remote NFC endpoint 330. Further, if there is not such a PDU within the time defined by a LLCP split parameter 344 (e.g., symmetry timeout timer) then a symmetry packet (e.g., SYMM PDU) may be transmitted instead. Further, upon transmission of any packet NFCC 312 may switch to the wait for reception mode. In the wait for reception mode, LLCP-Split interface extended features may be active and waiting for a PDU from the remote NFC endpoint 330. Further, if there is not such a PDU within the time defined by one of the LLCP split parameters 344 and/or a time defined during LLCP interface establishment (e.g., link failure timeout) then DH 340 may be notified. In an aspect, DH 340 may be notified by sending it a core interface error message (e.g., CORE INTERFACE ERROR NTF) with a timeout error code set (e.g., LLCP TIMEOUT ERROR). By contrast, if a PDU arrives PDU type determination module 318 will determine if the received PDU is an application data packet and may forward the PDU to the DH 340 using the static RF connection. If PDU type determination module 318 determines the PDU is a symmetry packet, then the packet may be discarded. Further, upon reception of any packet NFCC 312 may switch to the wait for transmission mode.

Accordingly, communications system 300 provides an environment to allow partitioning of LLCP functionality between NFCC 312 and DH 340.

FIGS. 4-12 illustrate methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
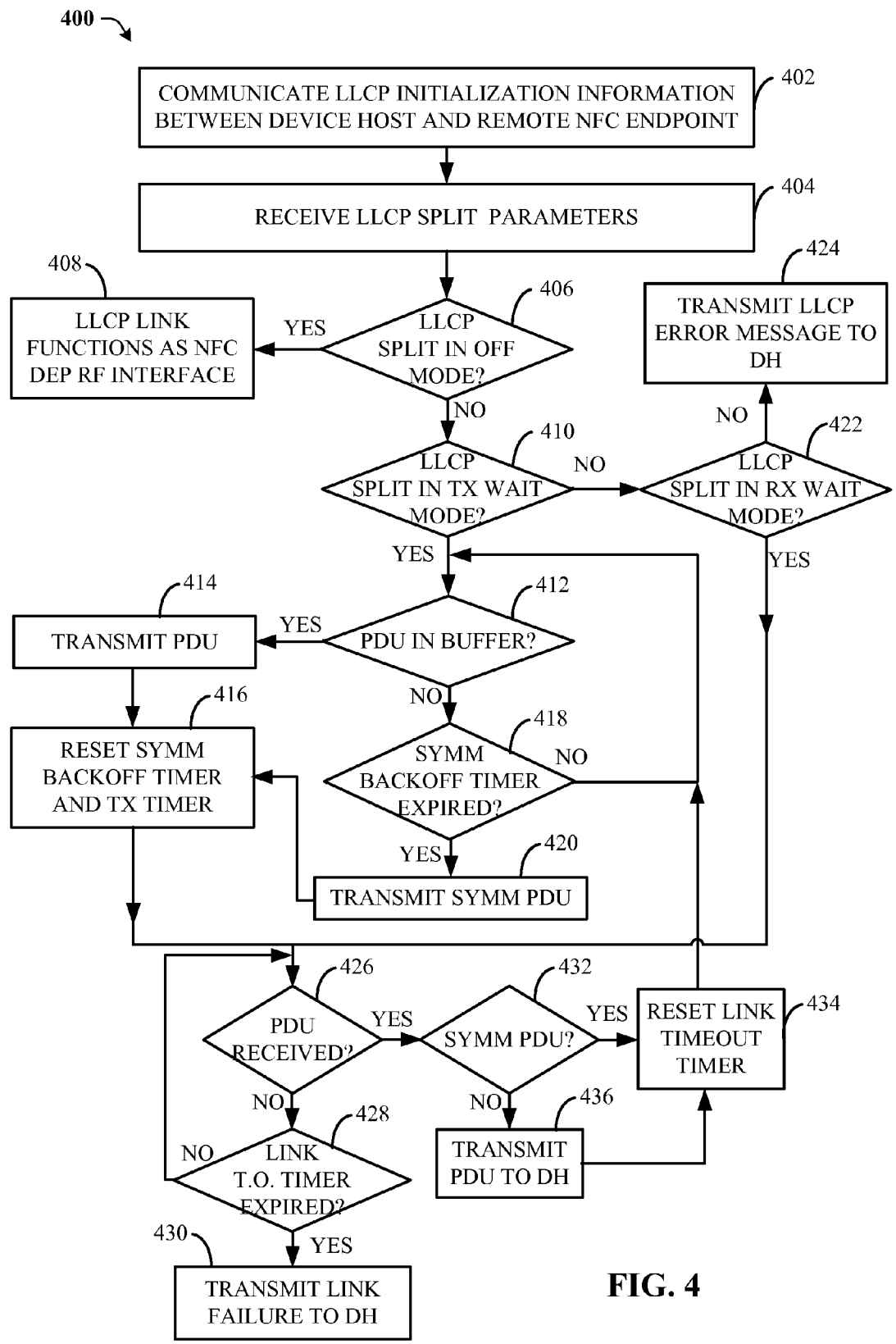
FIG. 4 is a flowchart describing an example of a NFCC to perform LLCP based communications, according to an aspect.

With reference now to FIG. 4, a flowchart describes an example process 400 for a NFCC to perform LLCP based communications is illustrated. At block 402, the NFCC may communicate LLCP initiation information between a device host (DH) and remote NFC endpoint. In an aspect, the information may include LLCP version information, one or more LLCP related timers (TX timer, RX timer), etc. At block 404, the NFCC may receive LLCP split parameters from the DH. In an aspect, the LLCP split parameters include a symmetry timer that defines a time duration that the NFCC waits to receive a PDU from the DH prior to transmitting a SYMM PDU, and a link timeout timer that defines a time duration that the NFCC waits for a PDU from the remote NFC endpoint prior to communicating a link failure message to the DH.

At block 406, the NFCC determines if the current mode of operation is an "Off" mode, as discussed above. If at block 406, the NFCC determines it is operational in an "Off" mode, then at block 408, the NFCC may maintain the LLCP link with the remote NFC endpoint as a NFC-DEP RF protocol based communication link. By contrast, if at block 406, the NFCC determines it is not operational in an "Off" mode, then a block 410, the NFCC determines if it is operational in a transmission wait mode. If at block 410 the NFCC determines that it is not operational in a transmission wait mode, then at block 422 the NFCC may determine if it is operational in a reception wait mode. If at block 422 the NFCC determines that it is not optional in a reception wait mode, then at block 424 an error message may be communicated to the DH at block 424.

If at block 410, the NFCC determines that it is operable in a transmission wait mode, then a block 412, the NFCC may determine if there are any application data packets (e.g., PDUs) ready for transmission (e.g., queued, buffered etc.). If at block 412, the NFCC determines there is an application data packet ready for transmission, then at block 414 the packet may be transmitted. In an aspect, the packet may be transmitted upon detection by the NFCC. In another aspect, the packet may be transmitted at some time before the expiration of symmetry timer. In such an aspect, the symmetry timer may be defined during initial LLCP establishment (block 402), and/or during LLCP split communication (block 404). Upon transmission of the packet, associated timers may reset and block 416. If the NFCC determines no packet is currently available for transmission at block 412, then at block 418, the NFCC determines if a symmetry timer has expired. If at block 418 the NFCC determines the symmetry timer has not expired, then the process may return to block 412 to determine if a PDU has arrived from transmission. By contrast, if at block 418, the symmetry timer has expired, then at block 420, a symmetry packet (SYMM PDU) may be generated and transmitted to the remote NFC endpoint, and the associated timers may be reset at block 416. As noted above, upon successful transmission of any packet (e.g., application data packet, symmetry packet), the NFCC may switch to functioning in a reception wait mode.

At block 426, the NFCC determines if a packet has been received. If at block 426, the NFCC determines that a packet has not been received, then at block 428, the NFCC determines if a link timeout (T.O.) timer has expired. In an aspect, the link timeout timer may be defined during initial LLCP establishment (block 402), and/or during LLCP split communication (block 404). If at block 428, the NFCC determines the link timeout timer has expired, then a block 428, the NFCC communicates a link failure message to the DH. If the link time out timer has not expired at block 428, then the process may return to block 426.

If at block 426, a packet it received, then a block 432, the NFCC determines if the packet is a symmetry packet (e.g., SYMM PDU). If at block 432, the packet is determined to be a symmetry packet, then the packet may be discarded and at block 434 the associated timers may be reset. By contrast, if at block 436, the packet is determined not to be a symmetry packet, then at block 436, the packet it communicated to the DH and at block 434 the associated timers are reset. As noted above, upon successful reception of any packet (e.g., application data packet, symmetry packet), the NFCC may switch to functioning in a transmission wait mode and return to block 412.

As such, a process is described for providing a NFCC functionality while being operated in a LLCP split mode.

Figure 5:
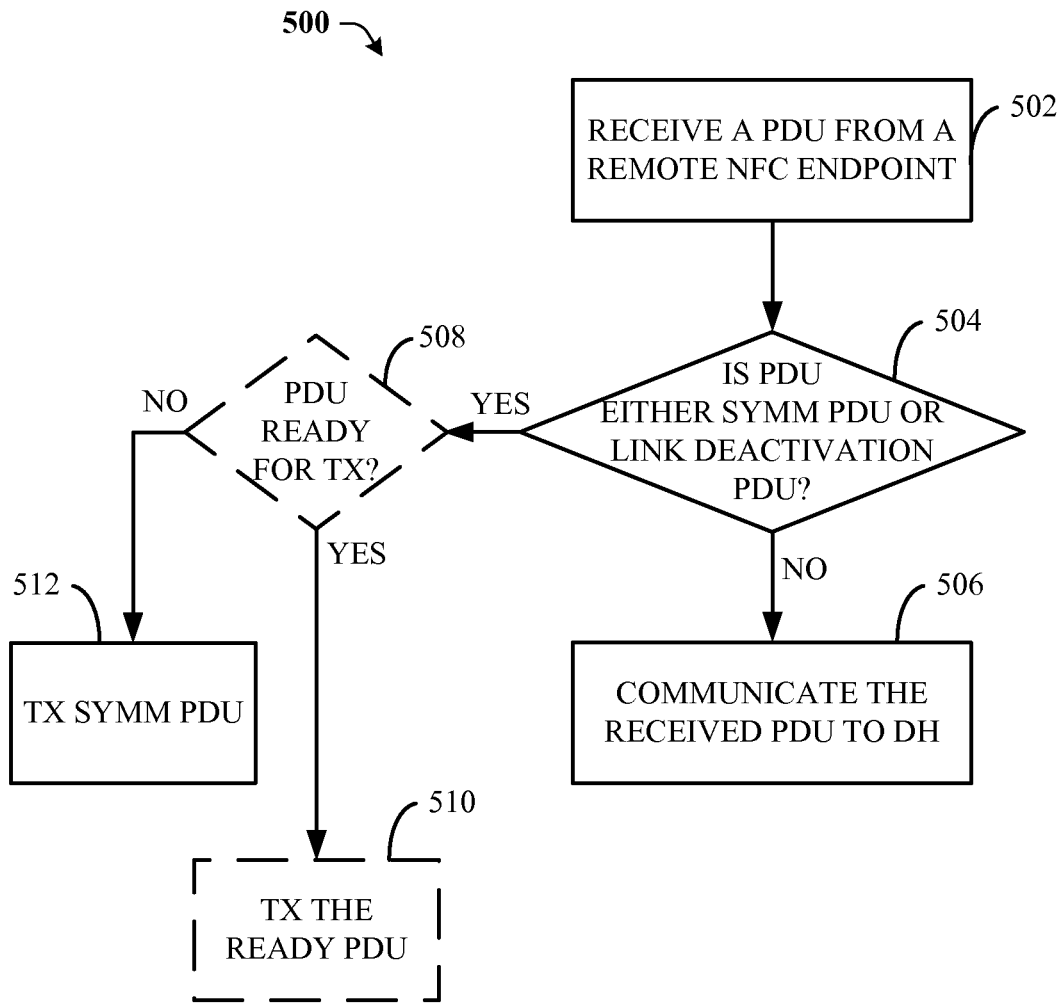
FIG. 5 is a flowchart describing another example of a NFCC to perform LLCP based communications, according to an aspect.

With reference now to FIG. 5, another flowchart describes an example process 500 for a NFCC to perform LLCP based communications is illustrated.

At block 502, a NFCC that is operable to perform LLCP split communications may receive a PDU from a remote NFC endpoint. In an aspect, the PDU may be a data unit including content, information, data, etc. intended for the DH. In another aspect, the PDU may be a symmetry PDU (e.g., SYMM PDU). In another aspect, the PDU may be a link deactivation PDU.

At block 504, the NFCC may determine whether the received PDU is either a SYMM PDU or a link deactivation PDU. In an aspect, during LLCP split communications, management of any combination of SYMM PDUs and/or link deactivation PDUs may be handled by the NFCC. In another aspect, during LLCP split communications, management of only SYMM PDUs may be handled by the NFCC, while link deactivation PDUs may be relayed to a DH. In another aspect, during LLCP split communications, management of only link deactivation PDUs may be handled by the NFCC, while SYMM PDUs may be relayed to a DH.

If at block 504, the NFCC determines that the received PDU is neither a SYMM PDU nor a link deactivation PDU, then at block 506 the NFCC may communicate the received PDU to the DH.

In an optional aspect, upon a determination that the received PDU is a link deactivation PDU, then the NFCC may perform a link deactivation procedure. In such an aspect, the NFCC may respond to the link deactivation PDU and may notifying the DH upon completion of the link deactivation procedure. In another optional aspect, upon a determination that the received PDU is a SYMM PDU, at block 508, the NFCC may determine whether a PDU is ready for transmission to a remote NFC endpoint.

If at optional block 508, the NFCC determines that a PDU is ready for transmission, then at optional block 510, the ready PDU may be transmitted to the remote NFC endpoint.

By contrast, if at optional block 508 there is not a PDU ready for transmission, then upon the expiration of a symmetry timer a SYMM PDU may be transmitted to the remote NFC endpoint from which the PDU was received. In an aspect, the SYMM PDU may be generated by the NFCC prior to expiration of the symmetry timer.

Figure 6:
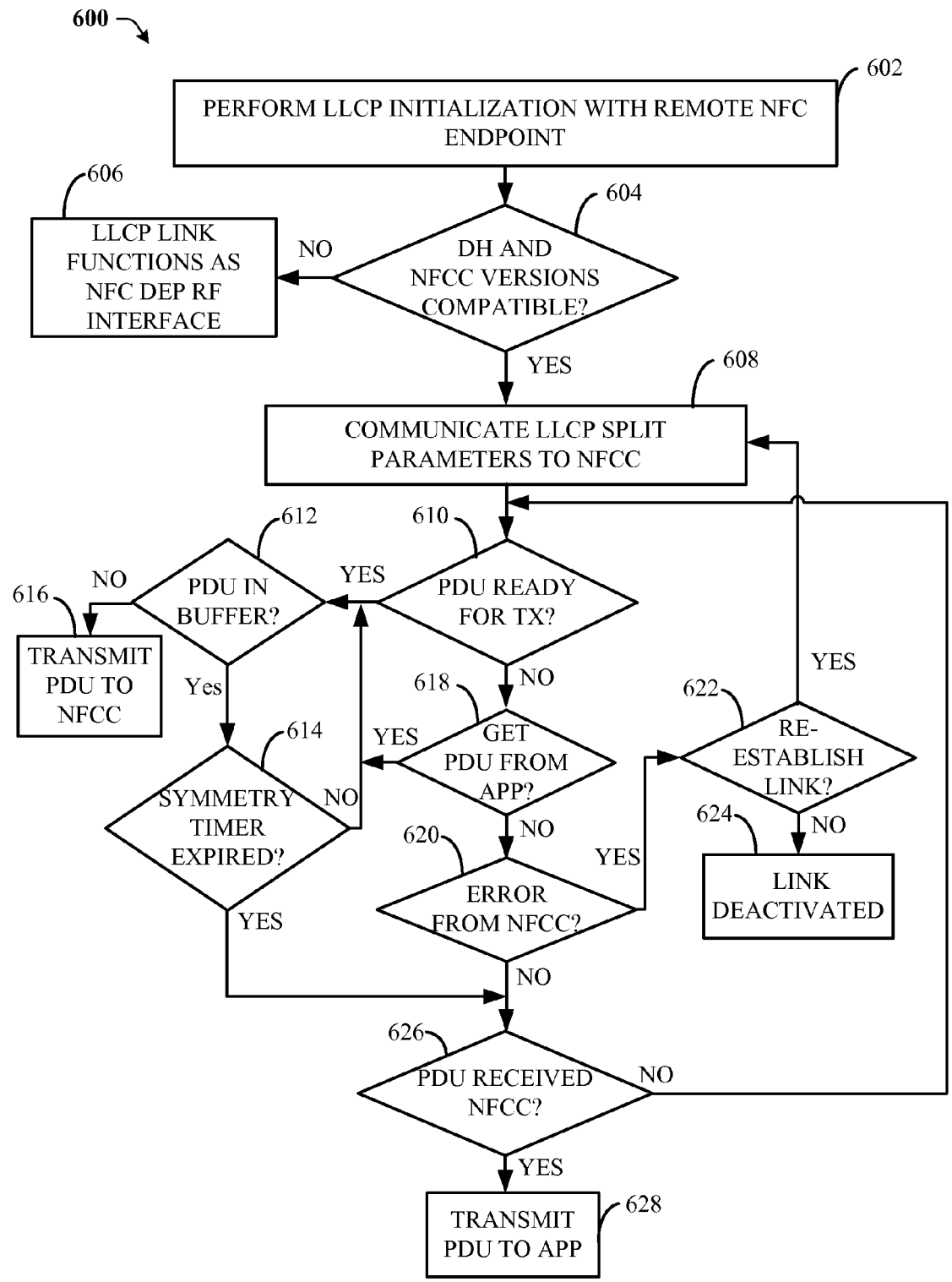
FIG. 6 is a flowchart describing an example of a DH to perform LLCP based communications, according to an aspect.

With reference now to FIG. 6, another flowchart describes an example process 600 for a DH to perform LLCP based communications is illustrated.

At block 602, the DH may perform LLCP initialization with a remote NFC endpoint. In an aspect, communications between the DH and the remote NFC endpoint are facilitated through a NFCC. At block 604, the DH determines whether the DH and NFCC are operable with compatible versions. For example where the NFCC LLCP version number is lower than the DH LLCP version number, then DH may decide whether LLCP-Split functionality is still usable. If the versions are compatible, then at block 608 the DH may configure the interface as LLCP-Split, otherwise at block 606, the DH may fall back to NFC-DEP usage in which the DH performs Symmetry functions. In another aspect, a block 604, the NFCC LLCP version number is higher than the DH LLCP version number, then DH may assume it does not understand what is communicated from the NFCC, and at block 606 the DH may configure the interface as NFC-DEP and perform Symmetry itself.

At block 608, the DH may communicate LLCP split parameters for use by the NFCC during LLCP split operations. In an aspect, the LLCP split parameters include a symmetry timer that defines a time duration that the NFCC waits to receive a PDU from the DH prior to transmitting a SYMM PDU, and a link timeout timer that defines a time duration that the NFCC waits for a PDU from the remote NFC endpoint prior to communicating a link failure message to the DH. In an aspect, the LLCP parameters may be determined by the DH based, at least in part, on a variety of factors, such as application latency requirements, device battery life, default LLCP values, user selected values.

At block 610, the DH may determine if one or more associated applications have a packet ready for transmission. If at block 610, the DH determines a packet is ready for communication, then at block 612 the DH may determine whether the NFCC is available to receive the packet. In an aspect, the NFCC may not be available to receive the transmission if a transmission buffer is occupied. If at block 612, the NFCC buffer is available to receive the packet, then at block 616 the packet to provide to the NFCC for transmission to the remote NFC endpoint. By contrast, if at block 612, the NFCC is not available to receive the packet, then at block 614 the DH may determine if a symmetry timer has expired. If at block 614, the symmetry timer has expired, then the window allocated for the DH to transmit a PDU has passed and the DH may determine if a PDU has been received from the NFCC at block 626. If the symmetry timer has not expired at block 614, then the process may return to block 612 to determine if the NFCC buffer is available to receive the packet.

If at block 610, the DH determines that no packet is ready for transmission, then at block 618, the DH continues to be available for reception of packets from one or more associated applications during a window defined by the symmetry timer. If a packet is received at block 618, then the process may return to block 612. If no packet is received at block 618, then the DH may determine if any error message has been received from the NFCC. In an aspect, an error message may be received associated with the LLCP link experiencing time out failure. In another aspect, an error message may be received associated with configuration issues between the NFCC and DH. If at block 620 an error message associated with the LLCP link is received, then at block 622 the DH may attempt to re-establish the LLCP link. If at block 622 the DH successfully re-establishes the LLCP link, then the process may return to block 608. If the DH is unable to successfully re-establish the LLCP link then at block 624 the link may be deactivated. In an aspect, the DH may transmit a discontinue packet (e.g., PISC PDU) to initiate deactivation of the LLCP link at the LLCP level. In an aspect, when the DH terminates the LLCP link, the DH may send a symmetry stop command (e.g., RF_LLCP_SYMMETRY_STOP_CMD) to the NFCC. In such an aspect, the NFCC may respond with a symmetry stop response (e.g., RF_LLCP_SYMMETRY_STOP_RSP), and at the next transmission opportunity, the NFCC may send a link disconnect PDU which is a special version of DISC-PDU which has both source and destination addresses set to 0 (e.g., DISC-PDU(0,0)). Further, the DH may reset (e.g., set to zero) the LLCP split parameters upon deactivation of the associated LLCP link. If at block 620 no error has been received from the NFCC, then at block 626 the DH determines if a PDU has been received from the NFCC. If at block 626 a PDU has been received from the NFCC, then at block 628 the PDU may be communicated to the target application. By contrast, if no PDU has been received from the NFCC at block 626, then the process may return to block 610.

As such, a process is described for providing DH functionality while being operated in a LLCP split mode.

Figure 7:
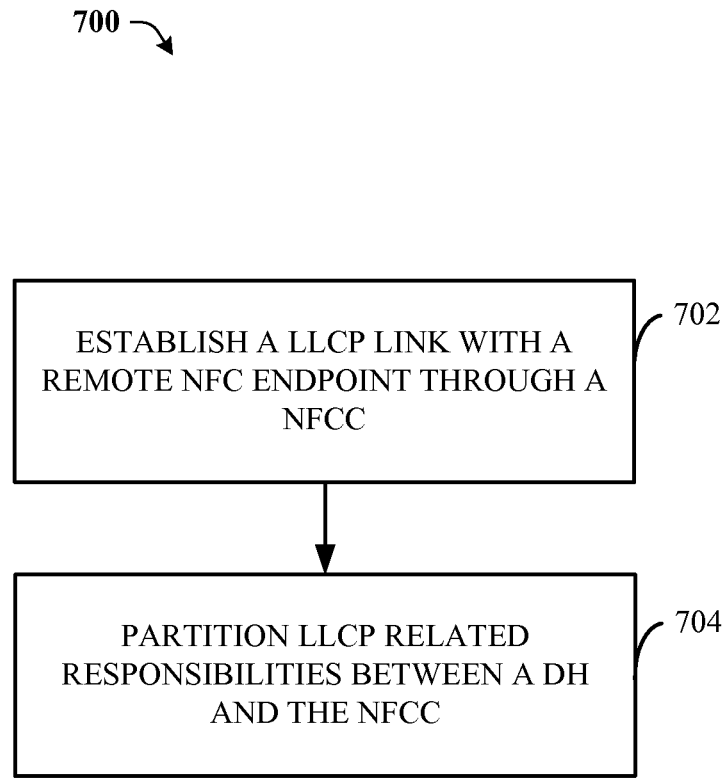
FIG. 7 is a flowchart describing another example of DH to perform LLCP based communications, according to an aspect.

With reference now to FIG. 7, another flowchart describes an example process 700 for a DH to perform LLCP based communications is illustrated.

At block 702, a DH may be operable to establish a LLCP link with a remote NFC endpoint through a NFCC.

At block 704, the DH may partition LLCP related responsibilities between a DH and the NFCC when the NFCC is operable for LLCP split communications. In an aspect, during the LLCP split communications, the NFCC may be responsible for LLCP symmetry functionality and the DH may be responsible for non-LLCP symmetry functionality. Further, in such an aspect, the DH may transmit LLCP split parameters to the NFCC to assist with the LLCP symmetry functionality. For example, the LLCP split parameters may include a symmetry timer that defines a time duration that the NFCC waits to receive a PDU from the DH prior to transmitting a SYMM PDU, a link timeout timer that defines a time duration that the NFCC waits for a PDU from the remote NFC endpoint prior to communicating a link failure message to the DH, etc. In an aspect, the DH may transmit the LLCP split parameters using a core set configuration message, commands specific to configuration of the LLCP split communications, etc. In another aspect, when the NFCC is LLCP version is different than the DH LLCP version number and/or when the NFCC is not operable to perform LLCP split communications then the DH may manage the LLCP link as a NFC-DEP RF Interface.

Figure 8:
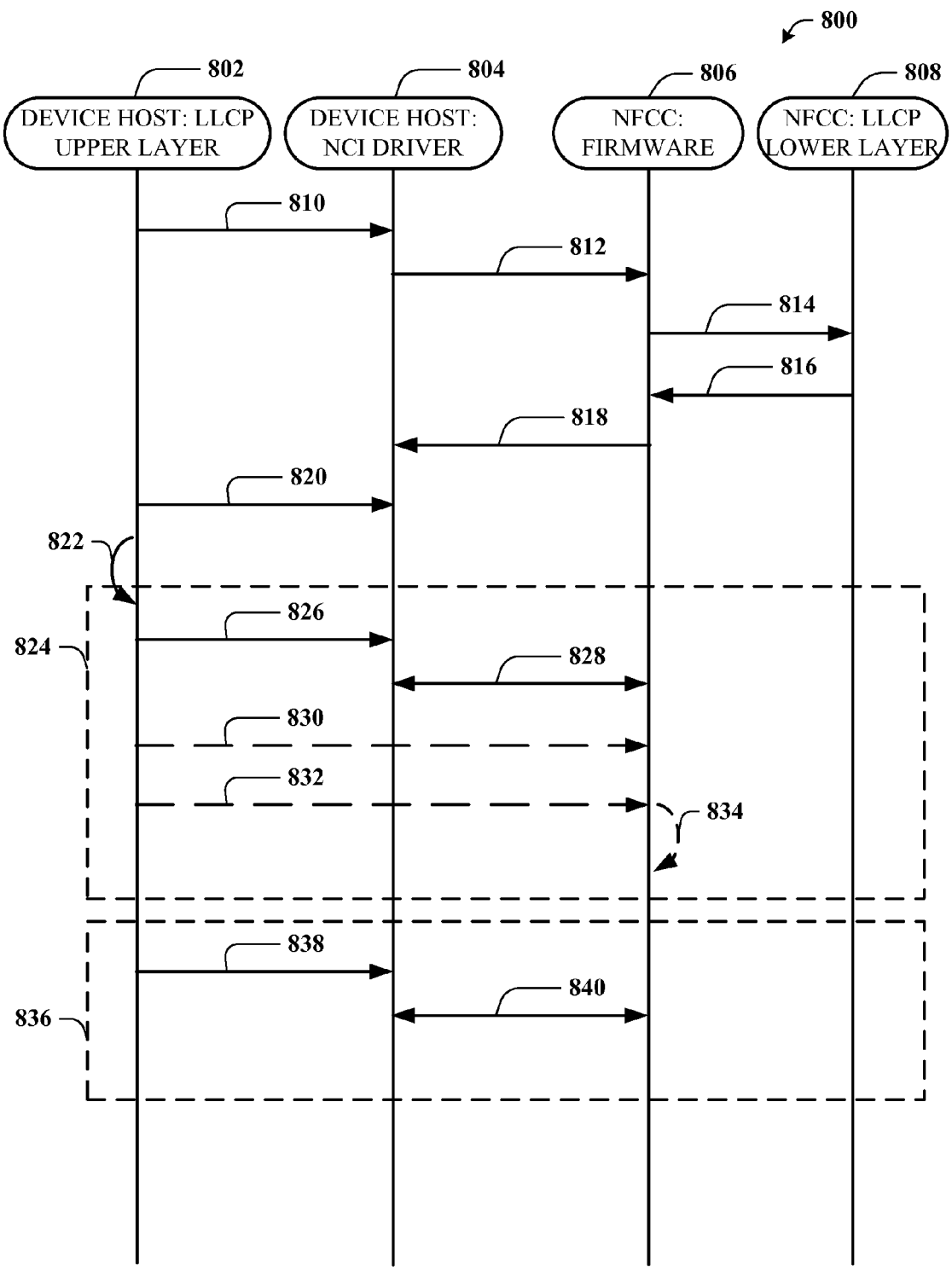
FIG. 8 is a call flow diagram describing an example of initiating LLCP based communications, according to an aspect.

With reference now to FIG. 8, a call flow diagram that describes an example system for initiating split LLCP functionality is illustrated. As depicted in FIG. 8 a NFC device 800 may include a device host: LLCP upper layer 802, a Device host: NCI Driver 804, NFCC: firmware 806, and a NFCC: LLCP lower layer 808. As used herein LLCP lower layer 808 is operable to perform symmetry procedures associated with a LLCP link, while LLCP upper layer 802 is operable to perform all other procedures associated with the LLCP link.

At act 810, the DH: LLCP upper layer 802 may use a message to attempt to fetch the LLCP version in use by the NFCC. The message may be communicated through DH: NCI driver 804 and NFCC: NCI firmware 806 to NFCC: LLCP Lower layer 808 at acts 812 and acts 814. At acts 816, 818, and 820 the NFCC: lower layer 808 may respond via NFCC: NCI firmware 806 and DH: NCI driver 804. In an aspect, by fetching a parameter (e.g., a read-only parameter) the DH: LLCP upper later 802 can infer the capability of the NFCC: LLCP lower layer 808, and thus at act 822, the DH: upper layer 802 may decide whether a subsequent command (e.g., RF DISCOVER MAP CMD) may specify a LLCP-Split interface (block 824, where the Symmetry procedure is performed on the NFCC), or a NFC-DEP interface (block 836 where all LLCP functions, including Symmetry, are performed on the DH). For example, where the NFCC LLCP version number is lower than the DH LLCP version number, then DH: upper layer 802 may decide whether LLCP-Split functionality is still usable. If the versions are compatible, then at the DH: upper layer 802 may configure the interface as LLCP-Split (block 824), otherwise, the DH: upper layer 802 may fall back to NFC-DEP usage in which the DH performs Symmetry functions (block 836). In another aspect, where the NFCC LLCP version number is higher than the DH LLCP version number, then DH: upper layer 802 may assume it does not understand what is communicated from the NFCC, and the DH: upper layer 802 may configure the interface as NFC-DEP and perform Symmetry itself (block 836).

Where the DH: upper layer 802 determines the NFCC is compatible with LLCP split functionality, then DH: upper layer 802 may send a LLCP split set up message (e.g., RF_LLCP_SYMMETRY_START_CMD) to NFCC: firmware 806 via DH: NCI driver 804 at acts 826 and 628.

In an optional aspect, at act 830, DH: upper layer 802 may send a LLCP split update message (e.g., RF_LLCP_SYMMETRY_START_CMD) to NFCC: firmware 806 via DH: NCI driver 804. In such an aspect, NFCC: firmware 806 may use the values received in the update message after an associated waiting time (e.g., initially defined waiting time) has completed.

In another optional aspect, at act 832, DH: upper layer 802 may send a LLCP split suspend message (e.g., RF_LLCP_SYMMETRY_START_CMD) to NFCC: firmware 806 via DH: NCI driver 804. The suspend message may indicate to the NFCC: firmware 806 to cease and/or suspend LLCP split functionality. In an aspect, the suspend message (e.g., RF_LLCP_START_SYMMETRY_CMD) may include timeout parameters (e.g., remote link timeout, local symmetry timeout, etc.) set to zero "0". In such an optional aspect, at act 834, upon receipt of the suspend message with the timeout parameters set to "0", NFCC: firmware 806 may discontinue any LLCP split functionality and begin forwarding any received PDUs for processing to the DH: upper layer 802 and may also not send any PDUs other than those received from the DH: upper layer 802.

Where the DH: upper layer 802 determines the NFCC is not compatible and/or operable for LLCP split functionality, then DH: upper layer 802 may send a NFC data exchange protocol (DEP) set up message to NFCC: firmware 806 via DH-NCI driver 804 at acts 838 and 840.

Figure 9:
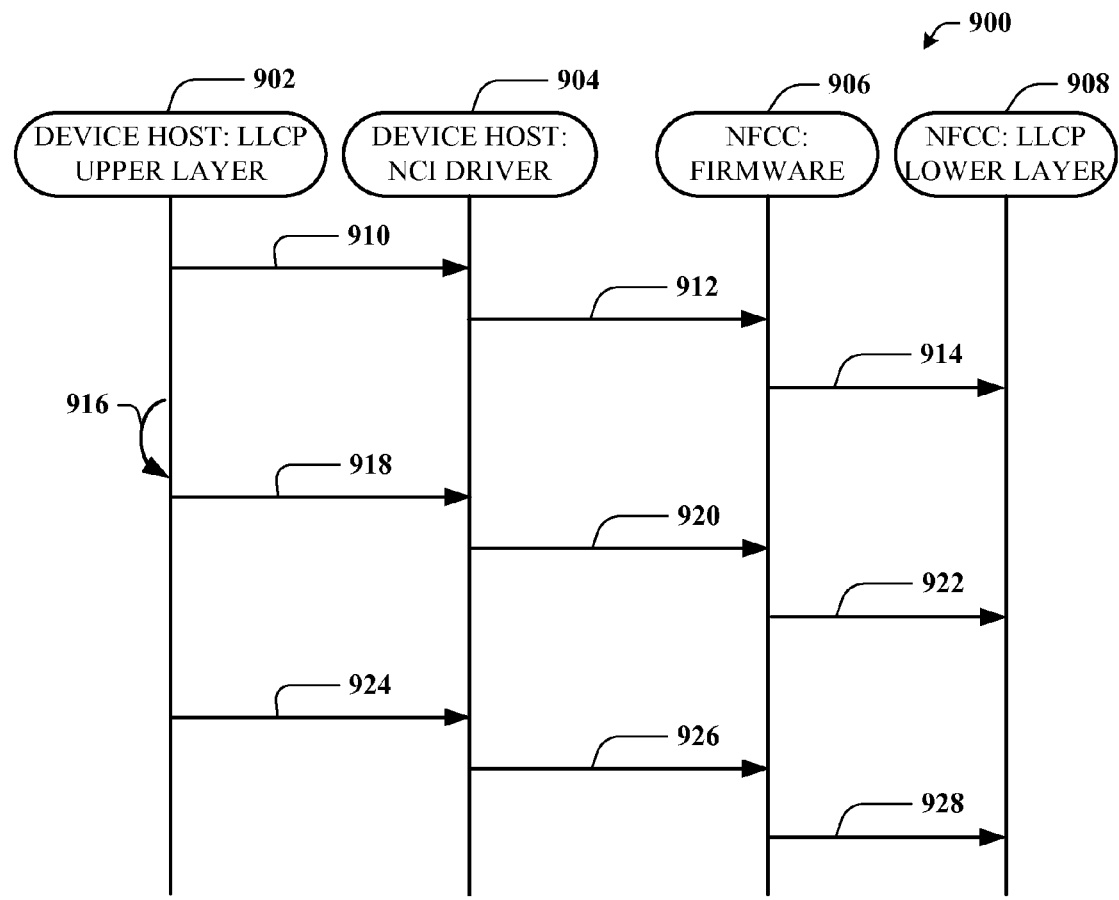
FIG. 9 is a call flow diagram describing an example of activating LLCP split functionality according to an aspect.

With reference now to FIG. 9, a call flow diagram that describes an example system for activating split LLCP functionality is illustrated. As depicted in FIG. 9 a NFC device 900 may include a device host: LLCP upper layer 902, a Device host: NCI Driver 904, NFCC: firmware 906, and a NFCC: LLCP lower layer 908.

Generally, having selected the LLCP-Split interface during initialization, the device host: LLCP upper layer 902 may decide whether the LLCP portion on the NFCC is capable of supporting the LLCP version reported from the remote NFC endpoint. If the remote NRF endpoint is not compatible, then the DH may keep the NFCC portion in "Off" state, as discussed above, and operate as if the NFC-DEP interface has been selected during initialization (e.g., FIG. 8, act 836). If the decision is made to activate the LLCP portion on the NFCC, at least the following parameter values may be set. The link timeout (LTO) value received from the remote NFC endpoint, so that the DH may be notified in the case of a link failure. The local Symmetry timeout value, which may be calculated by the LLCP portion on the DH according to the LLCP mode of operation. For example, where the mode is initiator mode, the symmetry value may be obtained by subtracting a backoff interval from the local LTO value. This is calculated to provide a suitable tradeoff between power consumption and response time. Once all parameters have been set, the DH can activate the NFCC portion of LLCP by setting a mode parameter to indicate the mode of operation (e.g., 1 to select Initiator, 2 to select Target)

At acts 910, 912, and 914, DH: LLCP upper layer 902 may communicate a link time out value to NFCC: Lower layer 908 via DH: NCI driver 904 and NFCC: firmware 906. As noted above, the link time out value may be received from the remote NFC endpoint during link initialization. At act 916, the DH: upper layer may calculate a symmetry timeout value. The symmetry timeout value may be used to indicate to the NFCC how long it waits for a "real" PDU to transmit before inserting a SYMM PDU. This can be scaled up to a point. In an aspect, the limit of the scaling may be the time commitment to the Remote NFC Endpoint made during connection establishment. In an aspect, a PDU, if available, may be transmitted prior to the expiration of the symmetry timeout value. In such an implementation a tradeoff between power consumption and data transfer rates exists where the longer you wait, the lower the average power consumed, but the longer the other device has to wait if it has data to send. Where the device is in an initiator mode, the symmetry value may be determined by subtracting a backoff interval from the local LTO value. The LTO value may not be scales because it represents the time the remote NFC endpoint is allocated for sending a PDU. This is calculated to provide a suitable tradeoff between power consumption and response time.

Where the device is in a target mode, the symmetry timeout value may be determined by subtracting a backoff interval from the response waiting time (RWT) value, which is itself calculated from the time out (TO) field sent in the remote NFC endpoint answer to reset (ATR) response (RES). At acts, 918, 920, and 922, at least one of the calculated symmetry timeout values may be communicated from the DH: LLCP upper layer 902 to the NFCC: LLCP lower layer 908 via DH: NCI driver 904 and NFCC: firmware 906.

DH: upper layer 902 may subsequently inform the NFCC: lower layer 908 which mode of operation is operable (e.g., initiator or target).

Figure 10:
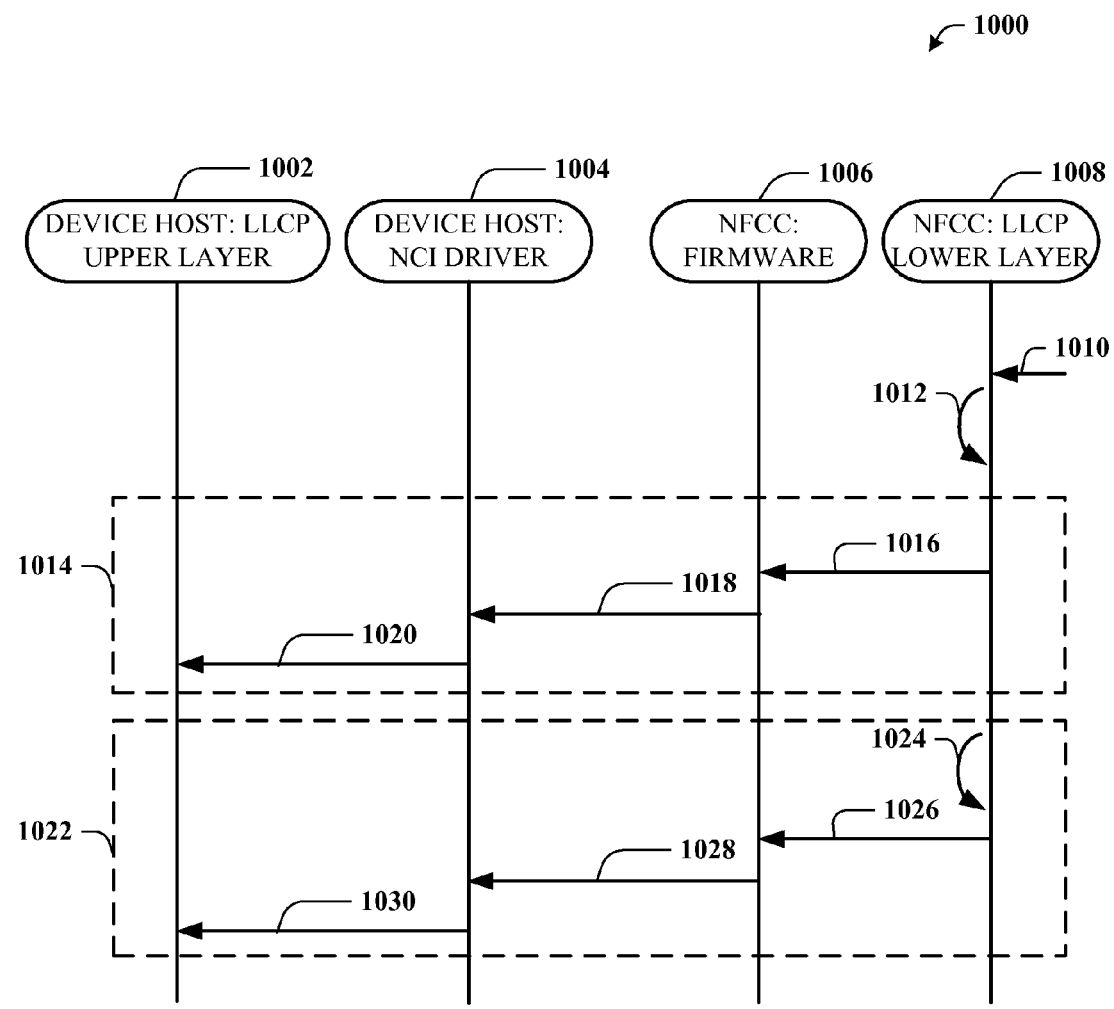
FIG. 10 is a call flow diagram describing an example of performing LLCP based communications, according to an aspect.

With reference now to FIG. 10, a call flow diagram that describes an example system for operating using split LLCP functionality is illustrated. As depicted in FIG. 10, a NFC device 1000 may include a device host: LLCP upper layer 1002, a Device host: NCI Driver 1004, NFCC: firmware 1006, and a NFCC: LLCP lower layer 1008.

At act 1010, NFCC: lower layer 1008 may receive a packet from a remote NFC endpoint. At act 1012. NFCC: Lower layer 1008 may determine whether the received packet is a symmetry packet (e.g., SYMM PDU). In operation, if a PDU arrives before the Remote LTO timer expires the PDU may be forwarded to the DH via the static RF connection (block 1014), unless the PDU is a SYMM PDU, in which case it will be discarded (block 1022). In either case the state changes from a wait for reception state to a wait for transmission state.

Where the received PDU is determined not to be a SYMM PDU (block 1014), at acts 1016, 1018, and 1020, the PDU may be communicated from NFCC: LLCP lower layer 1008 to DH: upper layer 1002 via NFCC: firmware 1006 and DH: NCI driver 1004. In an aspect, the NFCC may also be tasked with performing link deactivation. In such an aspect, where the received PDU is determined not to be a SYMM PDU or a DISC(0,0) PDU, the PDU may be communicated to the DH: upper layer 1002.

At act 1024, the NFCC: lower layer 1008 determines if the LTO timer has expired. If the Remote LTO time expires the DH may be notified by sending a notification message (e.g., RF_LLCP_SYMMETRY_STOP_NTF) and/or an error notification message (e.g., CORE INTEFACE ERROR NTF) with a timeout error code set. If the LTO timer has expired, then at acts 1026, 1028, and 1030 allow the error notification to be transmitted from NFCC: LLCP lower layer 1008 to DH: upper layer 1002 via NFCC: firmware 1006 and DH: NCI driver 1004. In an aspect, before transmission of this error happens, the NFC-DEP link error recovery feature may cause a number of RF TIMEOUT ERROR notifications to be sent to the DH. In such an aspect, the DH: LLCP upper layer 1002 may safely ignore these notifications.

Figure 11:
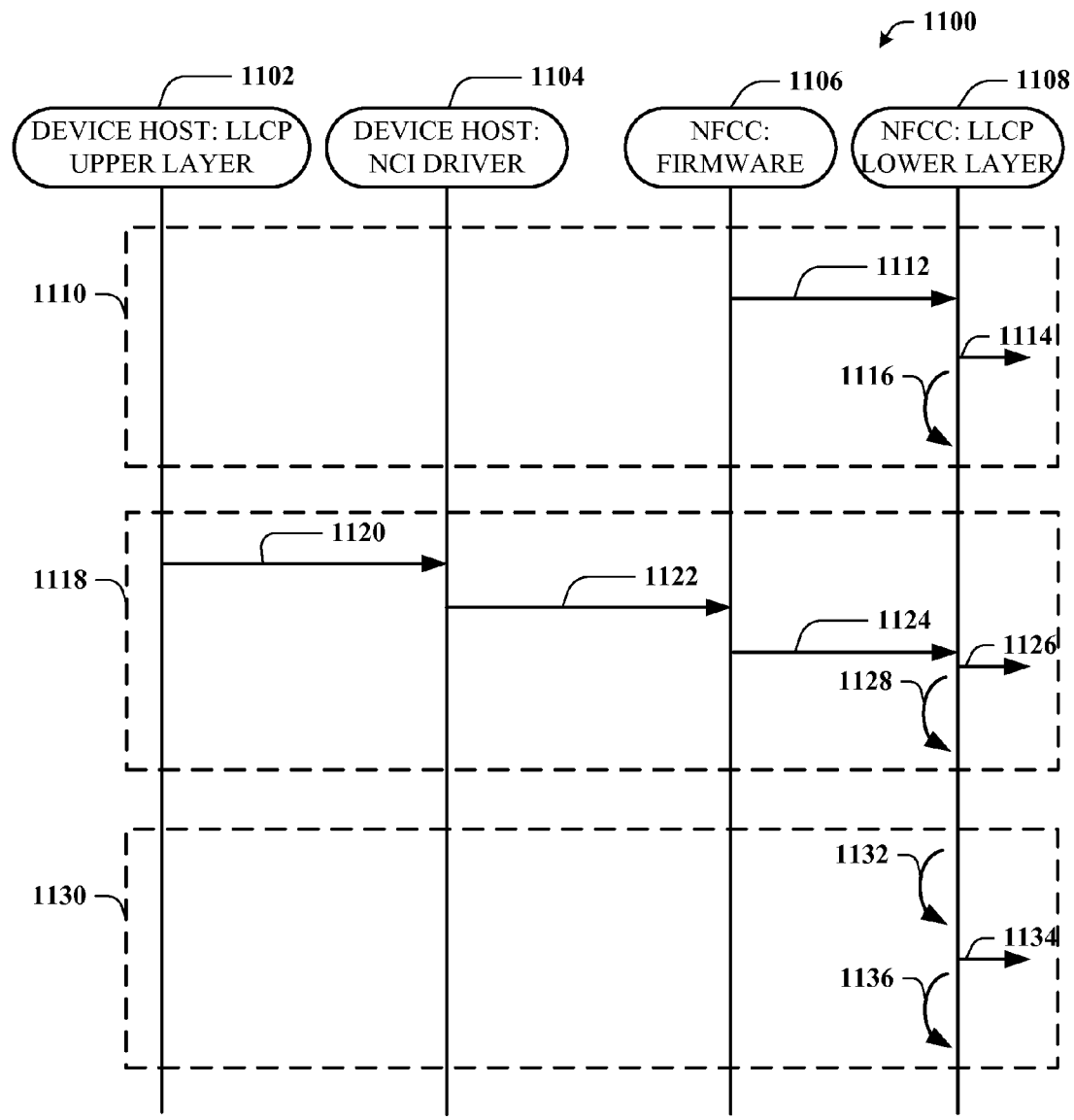
FIG. 11 is a call flow diagram describing another example of performing LLCP based communications, according to an aspect.

With reference now to FIG. 11, a call flow diagram that describes an example system for operating using split LLCP functionality is illustrated. As depicted in FIG. 11, a NFC device 1100 may include a device host: LLCP upper layer 1102, a Device host: NCI Driver 1104, NFCC: firmware 1106, and a NFCC: LLCP lower layer 1108.

In operation, where a NFC device 1100 is operable in a wait for transmission mode, three potential scenarios may arise (blocks 1110, 1118, and 1130). In block 1110, if on entry to wait for transmission state, a static RF connection buffer is found to contain a PDU at act 812 that has previously arrived from the DH. The PDU may be removed and transmitted to the remote NFC endpoint LLCP at act 814. At act 816, the symmetry timer may be reset, a LTO timer may be started, and the state may be changed to wait for reception mode.

In block 1118, at acts 1120, 1122, and 1124 a PDU is received from DH: LLCP upper layer 1102. If the PDU arrives from the DH before the Symmetry timer expires then at act 1126 the PDU may be removed and transmitted to the remote NFC endpoint. At act 1128, the symmetry timer may be reset, a LTO timer may be started, and the state may be changed to wait for reception mode.

In block 1130, at act 1132 the symmetry timer is determined to have expired. At act 1134, a symmetry packet (e.g., SYMM PDU) is generated and transmitted to the remote NFC endpoint. At act 1136, the symmetry timer may be reset, a LTO timer may be started, and the state may be changed to wait for reception mode.

Figure 12:
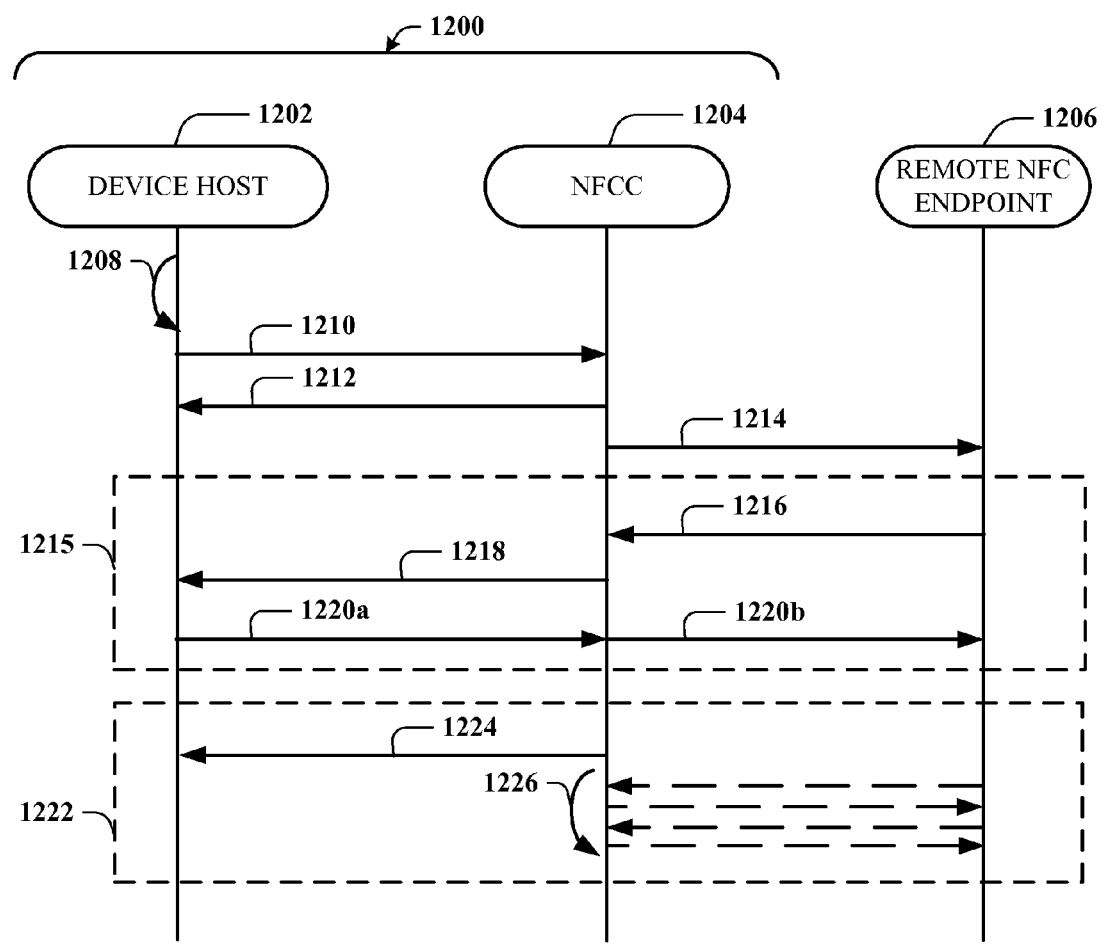
FIG. 12 is a call flow diagram describing an example of performing LLCP split based communications link deactivation, according to an aspect.

With reference now to FIG. 12, a call flow diagram that describes an example system for performing split LLCP link deactivation is illustrated. As depicted in FIG. 12, a NFC device 1200 may include a device host 1202, a NFCC 1204 and may be in communication with a Remote NFC endpoint 1206.

At act 1208, DH 1202 may decide to terminate a LLCP link. At act 1210, the DH 1202 may send a stop symmetry command (e.g., RF_LLCP_SYMMETRY_STOP_CMD) to NFCC 1204, and act 1212 NFCC 1204 may respond to DH 1202 with a symmetry stop response (e.g., RF_LLCP_SYMMETRY_STOP_RSP). In an aspect, at act 1214, at the next transmission opportunity, the NFCC may transmit a link disconnect PDU (e.g., DISC-PDU) to remote NFC endpoint 1206. In another aspect, if while waiting for the chance to send the disconnect PDU, the device 1200 receives a disconnect PDU from the remote NFC endpoint 1206, then this reception may pre-empt the NFCC 1204 sending the disconnect PDU because coincidentally, the remote NFC endpoint 1206 has already sent one.

As noted above, the LLCP split communication may be initiated by the device 1200 and or initiated by the remote NFC endpoint 1206. Block 1215 describes acts performed where the device 1200 initiated the LLCP split communication and block 1222 describes acts performed where the remote NFC endpoint initiated the LLCP split communication.

In block 1215, at act 1216, device 1200 may wait for any PDU in response from the Remote NFC Endpoint 1206 that indicates the stop of symmetry procedures. At act 1218, NFCC 1204 sends a symmetry stop notification to DH 1202 (e.g., RF_LLCP_SYMMETRY_STOP_NTF) with the reason "DH Request". Further, at acts 1220*a* and 1220*b*, DH 1202 may send an RF deactivation command (e.g., RF_DEACTIVATE_CMD) (1220*a*) through NFCC 1204 and on to (1220*b*) remote NFC endpoint 1206 which will stop NFC-DEP using a release request (e.g., RLS_REQ).

In block 1222, at act 1224, NFCC 1204 sends a symmetry stop notification to DH 1202 (e.g., RF_LLCP_SYMMETRY_STOP_NTF) with the reason "DH Request" and at act 1226 NFCC 1204 may enter a loop in which it just responds to any incoming PDU with a SYMM PDU regardless of whether it has any real data to transmit. NFCC 1204 may remain in this state until the LLCP link times out because the Remote NFC Endpoint 1206 stops sending any more PDUs.

Figure 13:
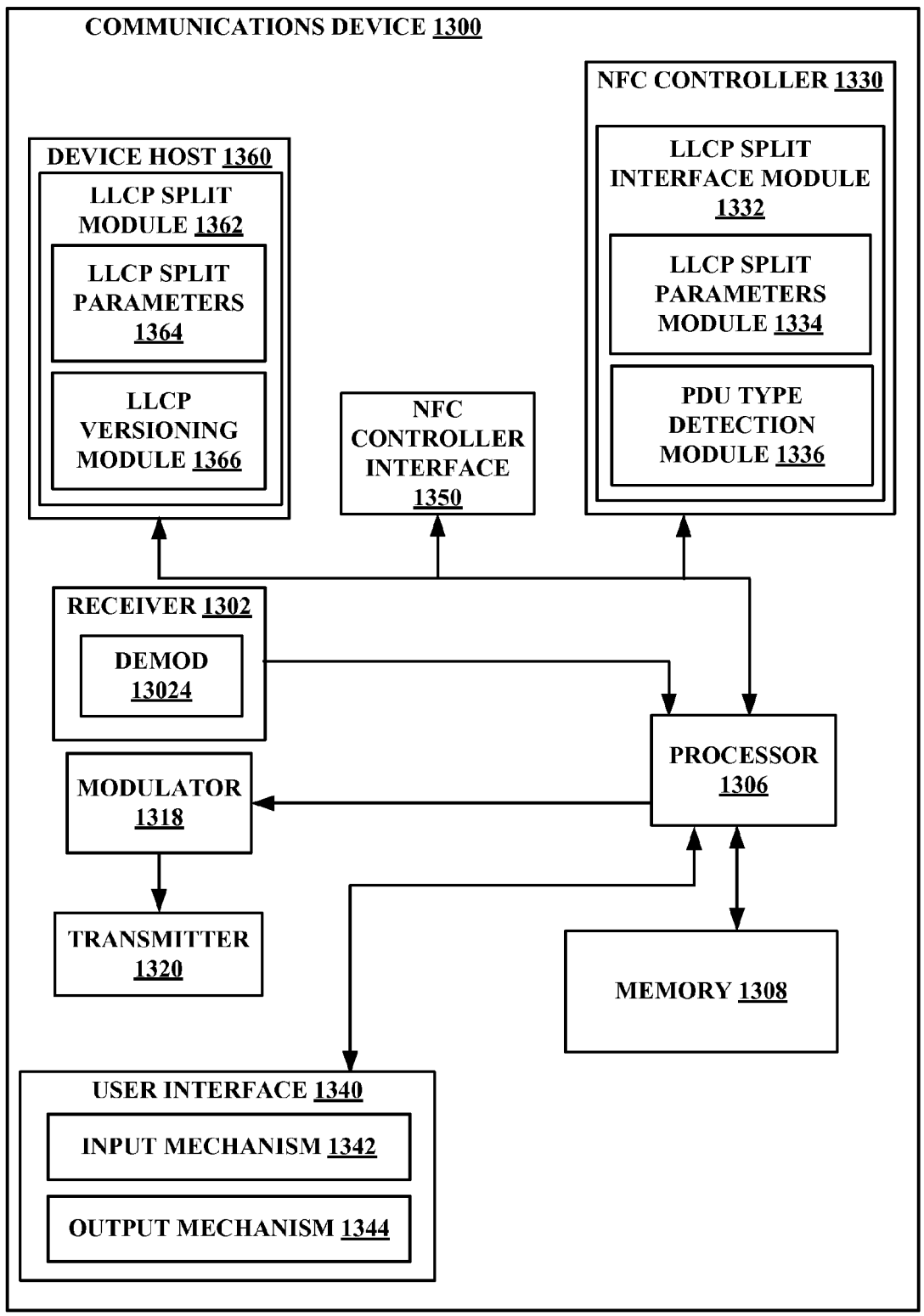
FIG. 13 is a functional block diagram of an example architecture of a communications device, according to an aspect.

While referencing FIG. 3, but turning also now to FIG. 13, an example architecture of communications device 1300 is illustrated. As depicted in FIG. 13, device 1300 comprises receiver 1302 that receives a signal from, for instance, a receive antenna (not shown), performs typical actions on (e.g., filters, amplifies, downconverts, etc.) the received signal, and digitizes the conditioned signal to obtain samples. Receiver 1302 can include a demodulator 1304 that can demodulate received symbols and provide them to processor 1306 for channel estimation. Processor 1306 can be a processor dedicated to analyzing information received by receiver 1302 and/or generating information for transmission by transmitter 1320, a processor that controls one or more components of device 1300, and/or a processor that both analyzes information received by receiver 1302, generates information for transmission by transmitter 1320, and controls one or more components of device 1300. Further, signals may be prepared for transmission by transmitter 1320 through modulator 1318 which may modulate the signals processed by processor 1306.

Device 1300 can additionally comprise memory 1308 that is operatively coupled to processor 1306 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 1306, receiver 1302, transmitter 1320, and/or a NFCC 1330 operable to perform logical link control protocol (LLCP) split communications can provide means for receiving a protocol data unit (PDU) from a remote NFC endpoint, means for determining whether the received PDU is a SYMM PDU or a link deactivation PDU, and means for communicating the received PDU to a device host (DH) upon a determination that the received PDU is not a SYMM PDU or a link deactivation PDU. In an aspect, the SYMM PDU and the link deactivation PDU may be associated with a LLCP link.

Still further, processor 1306, receiver 1302, transmitter 1320 and/or DH 1360 can provide means for establishing a LLCP link with a remote NFC endpoint through a NFCC, and means for partitioning LLCP related responsibilities between a DH and the NFCC when the NFCC is operable for LLCP split communications. In an aspect, during the LLCP split communications, the NFCC may be responsible for LLCP symmetry functionality and the DH may be responsible for non-LLCP symmetry functionality. Further, DH 1360 may provide means for determining whether a NFCC 1330 version is compatible with a DH 1360 version and whether the NFCC 1330 is operable for LLCP split communication, and means for transmitting LLCP split parameters to the NFCC 1330 to assist with the LLCP symmetry functionality upon a determination that the NFCC 1330 version is compatible with the DH 1360 version and the NFCC 1330 is operable for LLCP split communication, or means for managing the LLCP link as a NFC-DEP radio frequency interface (NFC-DEP RF Interface) interface upon a determination that at least one of the NFCC 1330 version is not compatible with the DH 1360 version or the NFCC 1330 is not operable for LLCP split communication. In an aspect, LLCP split communication allows the DH 1360 to receive data PDUs from the remote NFC endpoint while leaving management of SYMM PDUs to the NFCC 1330.

It will be appreciated that data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1308 of the subject systems and methods may comprise, without being limited to, these and any other suitable types of memory.

In another aspect, communications device 1300 may include NCI 1350. In an aspect, NCI 1350 may be operable to enable communications between a NFC enabled antenna (e.g., 1302, 1320) and NFC controller 1330.

Device host 1360 may include, among other modules, LLCP split module 1362, LLCP split parameters 1364, and LLCP versioning module 1366. In an operational aspect, device host 1360 may communicate LLCP split parameters 1364 to NFCC to initiate and/or maintain a LLCP split operational mode. In an aspect, LLCP parameters 1364 may include a symmetry timer that defines a time duration that the NFCC 1330 waits to receive a PDU from the device host 1360 prior to transmitting a symmetry packet (e.g., SYMM PDU), and a link timeout timer that defines a time duration that the NFCC 1330 waits for a PDU from the remote NFC endpoint prior to communicating a link failure message to the device host. In an aspect, LLCP split module 1362 may statically, semi-statically, and/or dynamically determine LLCP split parameters 1364 based at least in part on default settings, power consumption, battery life, user settings, application latency settings, etc. In another aspect, LLCP versioning module 1366 may determine compatibility with NFCC 1330. With LLCP functionality split across DH 1360 and NFCC 1330, the version of LLCP supported is relevant. In operation the LLCP versioning module 1366 may fetch a parameter from NFCC 1330 to infer the capability of the NFCC 1330, and thus decide whether subsequent messaging (e.g., RF DISCOVER MAP CMD should specify a LLCP-Split interface (with Symmetry functionality performed by NFCC 1330) or a NFC-DEP interface where LLCP functions, including Symmetry, may be performed by DH 1360. In an aspect, where the NFCC 1330 LLCP version number is the same as DH 1360, then LLCP versioning module 1366 may configure the interface as LLCP-Split. In another aspect, where the NFCC 1330 LLCP version number is lower than the DH 1360 LLCP version number, then LLCP versioning module 1366 may decide whether LLCP-Split functionality is still usable. If it is, LLCP versioning module 1366 may configure the interface as LLCP-Split, otherwise LLCP versioning module 1366 may fall back to NFC-DEP usage and may prompt DH 1360 to perform Symmetry functions itself. In another aspect, where the NFCC 1330 LLCP version number is higher than the DH 1360 LLCP version number, then LLCP versioning module 1366 may assume DH 1360 does not understand what is communicated from NFCC 1330, and LLCP versioning module 1366 may configure the interface as NFC-DEP and perform Symmetry itself. Further, LLCP versioning module 1366 may prompt DH 1360 to exchange LLCP version numbers at link activation.

NFCC 1330 may include, among other modules, LLCP split interface module 1332, LLCP split parameters module 1334, and PDU type detection module 1336. In an aspect, where LLCP split functionality has been agreed upon between NFCC 1330 and DH 1360, LLCP split parameters module 1334 may received LLCP split parameters 1364 from DH 1360 and may apply the parameters to their respective timers and/or other functions. In an aspect, LLCP split parameters module 1334 may receive and process a symmetry timer that defines a time duration that the NFCC 1330 waits to receive a PDU from the DH 1360 prior to transmitting a SYMM PDU, and a link timeout timer that defines a time duration that the NFCC 1330 waits for a PDU from the remote NFC endpoint prior to communicating a link failure message to the DH 1360. In such an aspect, the LLCP split parameters may be received as, parameters in a core set configuration message, commands specific to LLCP split communications, etc. In an aspect, during LLCP split functionality, PDU type detection module 1336 may be operable to determine whether a received packet is a symmetry packet (e.g., SYMM PDU), or an application data packet (e.g., normal PDU). In operation, if PDU type detection module 1336 determines the received packet includes application data, then PDU type detection module 1336 communicated the received packet to DH 1360. In another aspect, if PDU type detection module 1336 determines the received packet includes a symmetry packet, then PDU type detection module 1336 does not communicate the symmetry packet to DH 1360, and rather determines whether a packet is ready for transmission to remote NFC endpoint. Where a packet is available for transmission, LLCP split interface module 1332 may transmit the packet within a time period defined during the LLCP establishment and/or by a LLCP split parameter 1364 provided by DH 1360. In another aspect, when no packet is currently waiting, LLCP split interface module 1332 may wait until the expiration of a time period defined during the LLCP establishment and/or by a LLCP split parameter 1364 provided by DH 1360, and upon no receipt of an application data packet, LLCP split interface module 1332 may generate a symmetry packet (e.g., SYMM PDU) for transmission to remote NFC endpoint. In another aspect, LLCP split interface module 1332 may detect reception of an application data packet within the time period defined during the LLCP establishment and/or by a LLCP split parameter 1364 provided by DH 1360. In such an aspect, LLCP split interface module 1332 may transmit the packet prior to expiration of the defined time period.

Additionally, communications device 1300 may include user interface 1340. User interface 1340 may include input mechanisms 1342 for generating inputs into communications device 1300, and output mechanism 1344 for generating information for consumption by the user of the communications device 1300. For example, input mechanism 1342 may include a mechanism such as a key or keyboard, a mouse, a touch-screen display, a microphone, etc. Further, for example, output mechanism 1344 may include a display, an audio speaker, a haptic feedback mechanism, a Personal Area Network (PAN) transceiver etc. In the illustrated aspects, the output mechanism 1344 may include a display operable to present media content that is in image or video format or an audio speaker to present media content that is in an audio format.

Figure 14:
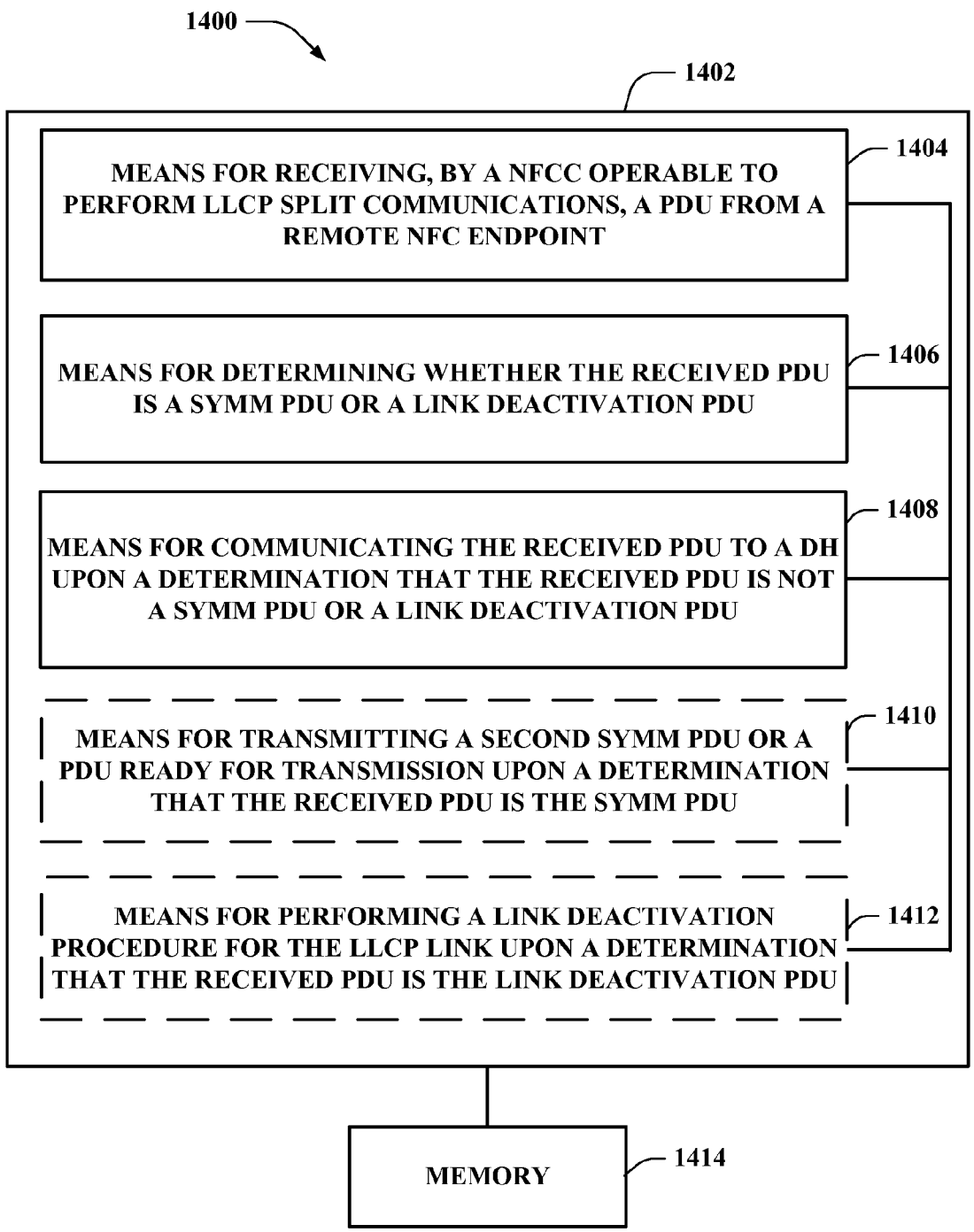
FIG. 14 is a functional block diagram of an example communication system for performing LLCP based communications, according to an aspect.

FIG. 14 is a block diagram depicting an exemplary communication system 1400 operable to provide mechanisms by which a NFC device may partition LLCP responsibilities between the NFCC and DH, according to an aspect. For example, system 1400 can reside at least partially within a communications device (e.g., communications device 1300). It is to be appreciated that system 1400 is represented as including functional blocks, which can represent functions implemented by a processor, software, or combination thereof (e.g., firmware). System 1400 includes a logical grouping 1402 of electrical components that can act in conjunction.

For instance, logical grouping 1402 can include an electrical component that may provide means for receiving, by a NFCC operable to perform LLCP split communications, a PDU from a remote NFC endpoint 1404. In an aspect, the electrical component 1404 may provide means for receiving a second PDU from the DH prior to expiration of a symmetry timer, and means for transmitting the second PDU to the remote NFC endpoint. In another aspect, electrical component 1404 may further provide means for receiving, from the DH, a symmetry timer that defines a time duration that the NFCC waits to receive a PDU from the DH prior to transmitting a SYMM PDU, a link timeout timer that defines a time duration that the NFCC waits for a PDU from the remote NFC endpoint prior to communicating a link failure message to the DH, etc. In such an aspect, the LLCP split parameters may be received as parameters in a core set configuration message, commands specific to configuration of the LLCP split communications, etc.

Further, logical grouping 1402 can include an electrical component that may provide means for determining whether the received PDU is a SYMM PDU or a link deactivation PDU 1406. In an aspect, the SYMM PDU and the link deactivation PDU may be associated with a LLCP link. In another aspect, the electrical component 1406 may provide means for determining whether a second PDU is available for transmission to the remote NFC endpoint, and means for transmitting the second PDU to the remote NFC endpoint prior to expiration of a symmetry timer upon a determination that the second PDU is available for transmission.

Further, logical grouping 1402 can include an electrical component that may provide means for communicating 1408 the received PDU to a device host (DH) upon a determination that the received PDU is not a SYMM PDU or a link deactivation PDU 1408. In an aspect, the means for communicating 1408 may be further configured to communicate any received PDUs to the DH, and communicate only PDU received from the DH to the remote NFC endpoint.

Further, in an optional logical grouping 1402 can include an electrical component that may provide means for transmitting a second SYMM PDU or a PDU ready for transmission upon a determination that the received PDU is the SYMM PDU 1410. In an aspect, the optional electrical component 1410 may provide means for generating the second SYMM PDU prior to the expiration of the symmetry timer.

Moreover, in an optional logical grouping 1402 can include an electrical component that may provide means for performing a link deactivation procedure for the LLCP link upon a determination that the received PDU is the link deactivation PDU 1412. In an aspect, the link disconnect PDU which is a special version of DISC-PDU which has both source and destination addresses set to 0 (e.g., DISC-PDU(0,0)). In an aspect, the means for performing a link deactivation procedure 1412 include means for responding to the received link deactivation PDU, means for deactivating the LLCP link, and means for notifying the DH when the link deactivation procedure is complete.

Additionally, system 1400 can include a memory 1414 that retains instructions for executing functions associated with the electrical components 1404, 1406, 1408, 1410, and 1412, stores data used or obtained by the electrical components 1404, 1406, 1408, 1410, 1412, etc. While shown as being external to memory 1414, it is to be understood that one or more of the electrical components 1404, 1406, 1408, 1410, and 1412 may exist within memory 1414. In an example, electrical components 1404, 1406, 1408, 1410, and 1412 can include at least one processor, or each electrical component 1404, 1406, 1408, 1410, and 1412 can be a corresponding module of at least one processor. Moreover, in an additional or alternative example, electrical components 1404, 1406, 1408, 1410, and 1412 may be a computer program product including a computer readable medium, where each electrical component 1404, 1406, 1408, 1410, and 1412 may be corresponding code.

Figure 15:
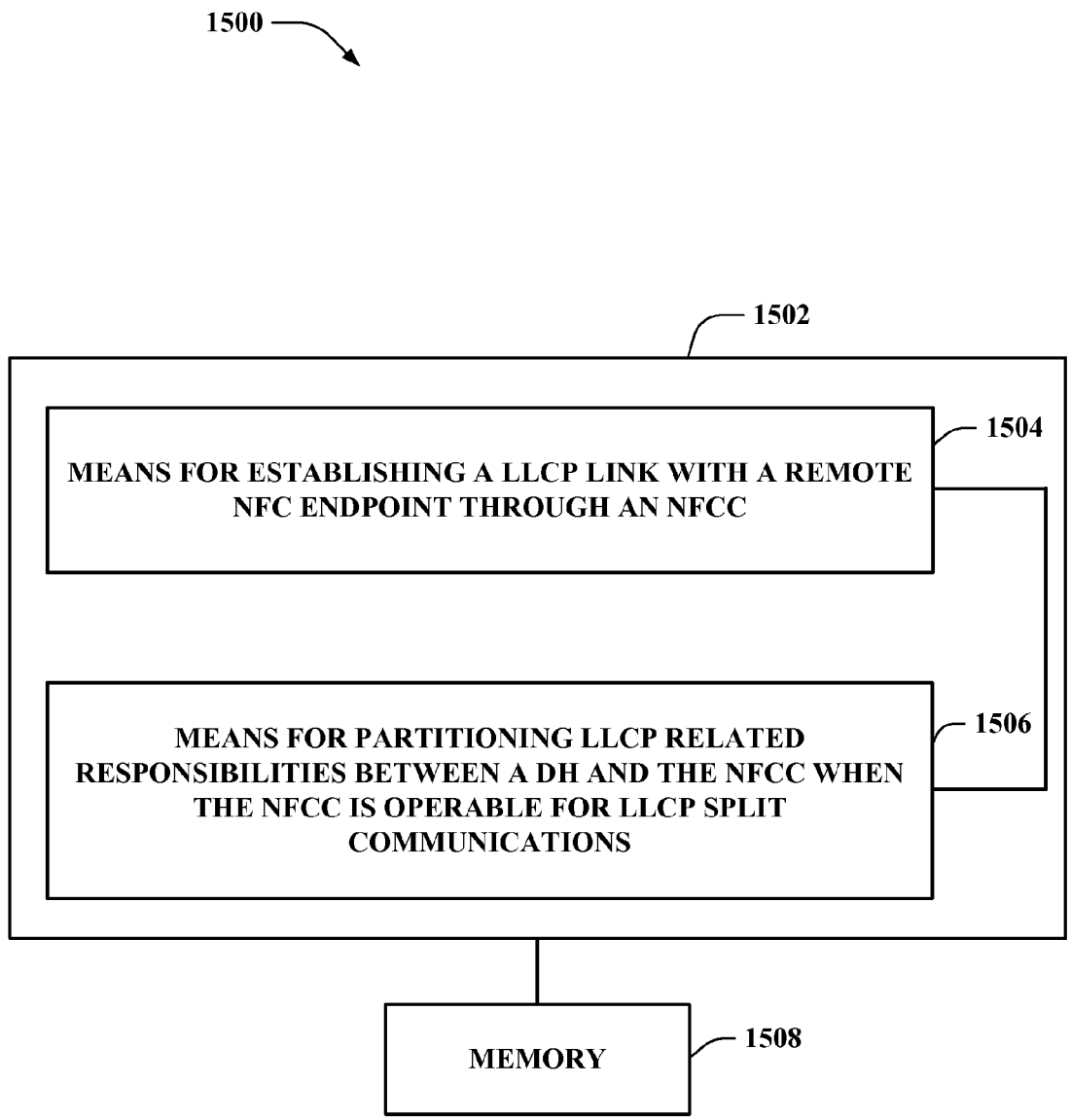
FIG. 15 is a functional block diagram of another example communication system for performing LLCP based communications, according to an aspect.

FIG. 15 depicts another depicts a block diagram of an exemplary communication system 1500 operable to provide mechanisms by which a NFC device may partition LLCP responsibilities between the NFCC and DH, according to an aspect. For example, system 1500 can reside at least partially within a communications device (e.g., communications device 1300). It is to be appreciated that system 1500 is represented as including functional blocks, which can represent functions implemented by a processor, software, or combination thereof (e.g., firmware). System 1500 includes a logical grouping 1502 of electrical components that can act in conjunction.

For instance, logical grouping 1502 can include an electrical component that may provide means for establishing a LLCP link with a remote NFC endpoint through a NFCC 1504.

Moreover, logical grouping 1502 can include an electrical component that may provide means for partitioning LLCP related responsibilities between a DH and the NFCC when the NFCC is operable for LLCP split communications 1506. In an aspect, during the LLCP split communications, the NFCC may be responsible for LLCP symmetry functionality and the DH may be responsible for non-LLCP symmetry functionality. Further, electrical component 1506 may provide means for determining whether a NFCC version is compatible with a DH version and whether the NFCC is operable for LLCP split communication, and means for transmitting LLCP split parameters to the NFCC to assist with the LLCP symmetry functionality upon a determination that the NFCC version is compatible with the DH version and the NFCC is operable for LLCP split communication. In an aspect, the LLCP split parameters may include a symmetry timer that defines a time duration that the NFCC waits to receive a PDU from the DH prior to transmitting a SYMM PDU, a link timeout timer that defines a time duration that the NFCC waits for a PDU from the remote NFC endpoint prior to communicating a link failure message to the DH, etc. In such an aspect, electrical component 1506 may provide means for transmitting the LLCP split parameters as parameters in a core set configuration message, commands specific to configuration of the LLCP split communications, etc. In another aspect, the electrical component 1506 may provide means for managing the LLCP link as a NFC-DEP radio frequency interface (NFC-DEP RF Interface) interface upon a determination that either the NFCC version is not compatible with the DH version or the NFCC is not operable for LLCP split communication. In an aspect, LLCP split communication allows the DH to receive data PDUs from the remote NFC endpoint while leaving management of SYMM PDUs to the NFCC. In still another aspect, LLCP split communication allows the DH to leave management of link deactivation PDUs to the NFCC.

Additionally, system 1500 can include a memory 1508 that retains instructions for executing functions associated with the electrical components 1504, and 1506, stores data used or obtained by the electrical components 1504, 1506, etc. While shown as being external to memory 1508, it is to be understood that one or more of the electrical components 1504 and 1506 may exist within memory 1508. In an example, electrical components 1504 and 1506 can include at least one processor, or each electrical component 1504 and can be a corresponding module of at least one processor. Moreover, in an additional or alternative example, electrical components 1504 and 1506 may be a computer program product including a computer readable medium, where each electrical component 1504 and 1506 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communication, comprising:
   receiving, by a near field communication (NFC) controller (NFCC), a protocol data unit (PDU) from a remote NFC endpoint;
   determining whether the received PDU is a symmetry (SYMM) PDU or a link deactivation PDU, the SYMM PDU and the link deactivation PDU associated with a logical link control protocol (LLCP) link;
   communicating the received PDU to a device host (DH) upon a determination that the received PDU is not a SYMM PDU or a link deactivation PDU; and
   receiving, by the NFCC from the DH, a link timeout timer that defines a time duration that the NFCC waits for a PDU from the remote NFC endpoint prior to communicating a link failure message to the DH.

2. The method of claim 1, further comprising:
   determining whether a second PDU is available for transmission to the remote NFC endpoint; and
   transmitting the second PDU to the remote NFC endpoint prior to expiration of a symmetry timer upon a determination that the second PDU is available for transmission.

3. The method of claim 1, further comprising:
   receiving a second PDU from the DH prior to expiration of a symmetry timer; and
   transmitting the second PDU to the remote NFC endpoint.

4. The method of claim 1, further comprising:
   determining that a second PDU is not available for transmission to the remote NFC endpoint prior to expiration of a symmetry timer;
   generating a second SYMM PDU; and
   transmitting the second SYMM PDU to the remote NFC endpoint upon the expiration of the symmetry timer.

5. The method of claim 1, wherein the NFCC is operable to perform logical link control protocol (LLCP) split communications such that LLCP functionality is partitioned between the NFCC and the DH.

6. The method of claim 5, further comprising:
   receiving, by the NFCC from the DH, a symmetry timer that defines a time duration that the NFCC waits to receive a PDU from the DH prior to transmitting a SYMM PDU, wherein the symmetry timer and link timeout timer are received as at least one of:
   parameters in a core set configuration message; or
   commands specific to configuration of the LLCP split communications.

7. The method of claim 6, wherein values associated with the symmetry timer and the link timeout timer are set to zero; and further comprising:
   communicating any received PDUs to the DH; and
   communicating only PDU received from the DH to the remote NFC endpoint.

8. The method of claim 1, wherein the determining further comprises determining that the received PDU is the link deactivation PDU; and
   performing a link deactivation procedure for the LLCP link.

9. The method of claim 1, wherein the NFCC operates in one or more modes defined by a radio frequency (RF) interface value.

10. A non-transitory computer-readable medium comprising code for:
    receiving, by a near field communication (NFC) controller (NFCC), a protocol data unit (PDU) from a remote NFC endpoint;
    determining whether the received PDU is a symmetry (SYMM) PDU or a link deactivation PDU, the SYMM PDU and the link deactivation PDU associated with a logical link control protocol (LLCP) link;
    communicating the received PDU to a device host (DH) upon a determination that the received PDU is not a SYMM PDU or a link deactivation PDU; and
    receiving, by the NFCC from the DH, a link timeout timer that defines a time duration that the NFCC waits for a PDU from the remote NFC endpoint prior to communicating a link failure message to the DH.

11. The non-transitory computer-readable medium of claim 10, further comprising:
    determining whether a second PDU is available for transmission to the remote NFC endpoint; and
    transmitting the second PDU to the remote NFC endpoint prior to expiration of a symmetry timer upon a determination that the second PDU is available for transmission.

12. The non-transitory computer-readable medium of claim 10, further comprising:
    receiving a second PDU from the DH prior to expiration of a symmetry timer; and
    transmitting the second PDU to the remote NFC endpoint.

13. The non-transitory computer-readable medium of claim 10, further comprising:
    determining that a second PDU is not available for transmission to the remote NFC endpoint prior to expiration of a symmetry timer;
    generating a second SYMM PDU; and
    transmitting the second SYMM PDU to the remote NFC endpoint upon the expiration of the symmetry timer.

14. The non-transitory computer-readable medium of claim 10, wherein the NFCC is operable to perform logical link control protocol (LLCP) split communications such that LLCP functionality is partitioned between the NFCC and the DH.

15. The non-transitory computer-readable medium of claim 14, further comprising:

receiving, by the NFCC from the DH, a symmetry timer that defines a time duration that the NFCC waits to receive a PDU from the DH prior to transmitting a SYMM PDU, wherein the symmetry timer and link timeout timer are received as at least one of:
parameters in a core set configuration message; or
commands specific to configuration of the LLCP split communications.

16. The non-transitory computer-readable medium of claim 15, wherein values associated with the symmetry timer and the link timeout timer are set to zero; and further comprising:
communicating any received PDUs to the DH; and
communicating only PDU received from the DH to the remote NFC endpoint.

17. The non-transitory computer-readable medium of claim 10, wherein the determining further comprises determining that the received PDU is the link deactivation PDU; and
performing a link deactivation procedure for the LLCP link.

18. An apparatus for communication, comprising:
means for receiving, by a near field communication (NFC) controller (NFCC), a protocol data unit (PDU) from a remote NFC endpoint;
means for determining whether the received PDU is a symmetry (SYMM) PDU or a link deactivation PDU, the SYMM PDU and the link deactivation PDU associated with a logical link control protocol (LLCP) link;
means for communicating the received PDU to a device host (DH) upon a determination that the received PDU is not a SYMM PDU or a link deactivation PDU; and
means for receiving, by the NFCC from the DH, a link timeout timer that defines a time duration that the NFCC waits for a PDU from the remote NFC endpoint prior to communicating a link failure message to the DH.

19. The apparatus of claim 18, wherein the means for determining is further configured to determine whether a second PDU is available for transmission to the remote NFC endpoint; and further comprising:
means for transmitting the second PDU to the remote NFC endpoint prior to expiration of a symmetry timer upon a determination that the second PDU is available for transmission.

20. The apparatus of claim 18, wherein the means for receiving is further configured to receive a second PDU from the DH prior to expiration of a symmetry timer; and further comprising:
means for transmitting the second PDU to the remote NFC endpoint.

21. The apparatus of claim 18, wherein the means for determining are further configured to:
determine that a second PDU is not available for transmission to the remote NFC endpoint prior to expiration of a symmetry timer; and
generate a second SYMM PDU; and further comprising:
means for transmitting the second SYMM PDU to the remote NFC endpoint upon the expiration of the symmetry timer.

22. The apparatus of claim 18, wherein the NFCC is operable to perform logical link control protocol (LLCP) split communications such that LLCP functionality is partitioned between the NFCC and the DH.

23. The apparatus of claim 22, wherein the means for receiving is further configured to receive, by the NFCC from the DH, a symmetry timer that defines a time duration that the NFCC waits to receive a PDU from the DH prior to transmitting a SYMM PDU, wherein the symmetry timer and link timeout timer are received as at least one of:
parameters in a core set configuration message; or
commands specific to configuration of the LLCP split communications.

24. The apparatus of claim 23, wherein values associated with the symmetry timer and the link timeout timer are set to zero; and wherein the means for communicating are further configured to:
communicate any received PDUs to the DH; and
communicate only PDU received from the DH to the remote NFC endpoint.

25. The apparatus of claim 18, wherein the means for determining are further configured to determine that the received PDU is the link deactivation PDU; and further comprising:
performing a link deactivation procedure for the LLCP link.

26. An apparatus for communication, comprising:
a near field communication (NFC) controller (NFCC) operable to:
receive, by the NFCC, a protocol data unit (PDU) from a remote NFC endpoint;
determine whether the received PDU is a symmetry (SYMM) PDU or a link deactivation PDU, the SYMM PDU and the link deactivation PDU associated with a logical link control protocol (LLCP) link;
communicate the received PDU to a device host (DH) upon a determination that the received PDU is not a SYMM PDU or a link deactivation PDU; and
receive, by the NFCC from the DH, a link timeout timer that defines a time duration that the NFCC waits for a PDU from the remote NFC endpoint prior to communicating a link failure message to the DH.

27. The apparatus of claim 26, and wherein the NFCC is further configured to:
determine whether a second PDU is available for transmission to the remote NFC endpoint; and
transmit the second PDU to the remote NFC endpoint prior to expiration of a symmetry timer upon a determination that the second PDU is available for transmission.

28. The apparatus of claim 26, and wherein the NFCC is further configured to:
receive a second PDU from the DH prior to expiration of a symmetry timer; and
transmit the second PDU to the remote NFC endpoint.

29. The apparatus of claim 26, wherein the NFCC is further configured to:
determine that a second PDU is not available for transmission to the remote NFC endpoint prior to expiration of a symmetry timer;
generate a second SYMM PDU; and
transmit the second SYMM PDU to the remote NFC endpoint upon the expiration of the symmetry timer.

30. The apparatus of claim 26, wherein the NFCC is operable to perform logical link control protocol (LLCP) split communications such that LLCP functionality is partitioned between the NFCC and the DH.

31. The apparatus of claim 30, wherein the NFCC is further configured to receive, from the DH, a symmetry timer that defines a time duration that the NFCC waits to receive a PDU from the DH prior to transmitting a SYMM PDU, wherein the symmetry timer and link timeout timer are received as at least one of:
parameters in a core set configuration message; or
commands specific to configuration of the LLCP split communications.

32. The apparatus of claim 31, wherein values associated with the symmetry timer and the link timeout timer are set to zero; and wherein the NFCC is further configured to:
- communicate any received PDUs to the DH; and
- communicate only PDU received from the DH to the remote NFC endpoint.

33. The apparatus of claim 26, wherein the determining further comprises determining that the received PDU is the link deactivation PDU; and
- performing a link deactivation procedure for the LLCP link.

* * * * *